(12) United States Patent
Hopkins et al.

(10) Patent No.: US 11,279,078 B2
(45) Date of Patent: Mar. 22, 2022

(54) MULTILAYER PARAMETER-VARYING FUSION AND DEPOSITION STRATEGIES FOR ADDITIVE MANUFACTURING

(71) Applicant: HEAVY METAL LLC, Fremont, CA (US)

(72) Inventors: Adam Bayne Hopkins, San Jose, CA (US); Salvatore Torquato, Princeton, NJ (US); Brandon Beberwyck, San Francisco, CA (US)

(73) Assignee: Heavy Metal LLC, Fremont, CA (US)

( * ) Notice: Subject to any disclaimer, the term of this patent is extended or adjusted under 35 U.S.C. 154(b) by 828 days.

(21) Appl. No.: 16/008,906

(22) Filed: Jun. 14, 2018

(65) Prior Publication Data
US 2018/0370114 A1     Dec. 27, 2018

Related U.S. Application Data

(60) Provisional application No. 62/520,340, filed on Jun. 15, 2017.

(51) Int. Cl.
*B29C 64/10* (2017.01)
*C08L 83/00* (2006.01)
(Continued)

(52) U.S. Cl.
CPC ............ *B29C 64/10* (2017.08); *B29C 64/209* (2017.08); *B33Y 10/00* (2014.12); *C08L 83/00* (2013.01)

(58) Field of Classification Search
CPC ......... B33Y 10/00; C08L 83/00; B29C 64/10; B29C 64/00; B29C 64/153; B29C 64/171; B29C 64/118; B29C 64/124; B29C 64/20
See application file for complete search history.

(56) References Cited

U.S. PATENT DOCUMENTS 5,155,324 A    10/1992  Deckard et al.
6,596,224 B1   7/2003   Sachs et al.
(Continued)

FOREIGN PATENT DOCUMENTS

JP        2013-151165 A    8/2013
WO    WO 2015/073081 A1   5/2015
(Continued)

OTHER PUBLICATIONS

Kamath, C. et al. (2014) "Density of additively-manufactured, 316L SS parts using laser powder-bed fusion at powers up to 400 W" Int J Adv Manuf Technol, 74:65-78.
(Continued)

*Primary Examiner* — Stella K Yi
(74) *Attorney, Agent, or Firm* — Cooley LLP

(57) ABSTRACT

The invention encompasses compositions and methods for designing or producing three-dimensional articles layer-by-layer, whereby the specific approach to build-up a region of a single layer by fusion, deposition of material, or other path-based process or non-path process that creates track-like geometries requires either differing track or track-like geometry, or track or track-like geometry printing parameters, within a region of a single layer or within adjoining regions of multiple layers, is disclosed. Employing this method, single layer or multilayer parameter-varying fusing and deposition strategies can be generated that reduce article fabrication time and improve article physical properties, in part by targeting a distribution of scan paths that satisfy covering problem overlap and/or dense packing criteria. Additionally, methods and compositions for designing or producing three-dimensional articles by altering the thickness of a material layer deposited during a print relative to the slice thickness or net displacement of a stage or of a material and/or energy-depositing print head, are disclosed.
(Continued)

Employing this method can result in the reduction of article fabrication time and/or the improvement of printed article physical properties, where these results advantageous to printing are dependent on the print process, material properties, and feedstock properties employed during the print.

11 Claims, 32 Drawing Sheets

(51) Int. Cl.
  *B29C 64/209* (2017.01)
  *B33Y 10/00* (2015.01)

(56) References Cited

U.S. PATENT DOCUMENTS

| | | | |
|---|---|---|---|
| 6,677,554 | B2 | 1/2004 | Darrah et al. |
| 7,569,174 | B2 | 8/2009 | Ruatta et al. |
| 2005/0142024 | A1 | 6/2005 | Herzog |
| 2014/0163445 | A1 | 6/2014 | Pallari et al. |
| 2014/0358273 | A1 | 12/2014 | La Bossiere et al. |
| 2015/0086409 | A1 | 3/2015 | Hellestam |
| 2016/0067928 | A1 | 3/2016 | Mark et al. |
| 2017/0021455 | A1 | 1/2017 | Dallarosa et al. |
| 2017/0136694 | A1 | 5/2017 | Rezai et al. |
| 2018/0104922 | A1* | 4/2018 | Busgen .................. B29C 69/02 |

FOREIGN PATENT DOCUMENTS

| | | |
|---|---|---|
| WO | WO 2017/079091 A1 | 5/2017 |
| WO | WO 2018/191728 A1 | 10/2018 |

OTHER PUBLICATIONS

Su, X. and Yang, Y. (2012) "Research on track overlapping during Selective Laser Melting of powders" J Mater Proc Technol, 212:2074-2079.

Yadroitsev, I. et al. (2010) "Single track formation in selective laser melting of metal powders" J Mater Process Technol, 210:1624-1631.

Yadroitsev, I. et al. (2015) "Hierarchical design principles of selective laser melting for high quality metallic objects" Additive Manufacturing, 7:45-56.

Yeung, H. et al. (Aug. 1, 2016) "Laser Path Planning and Power Control Strategies for Powder Bed Fusion Systems" Proceedings of the Solid Freeform Fabrication Symposium, Austin, TX [online]. Retrieved from: URL:https://www.researchgate.net/profile/Brandon_Lane/publication/310152847LASER_PATH_PLANNING_AND_POWER_CONTROL_STRATEGIES_FOR_POWDER_BED_FUSION_SYSTEMS/links/5829bb6108ae911e2a32701b/LASER-PATH-PLANNING-AND-POWER-CONTROL-STRATEGIES-FOR-POWDER-BED-FUSION-SYSTEMS.pdf?origin=publication detail [retrieved on Jul. 12, 2018]; 16 pages.

\* cited by examiner

——— Layer
- - - - Layer n+1

Layer n

Layer n+1

Layer n

Layer n+1

Layer n+2

Section ╪

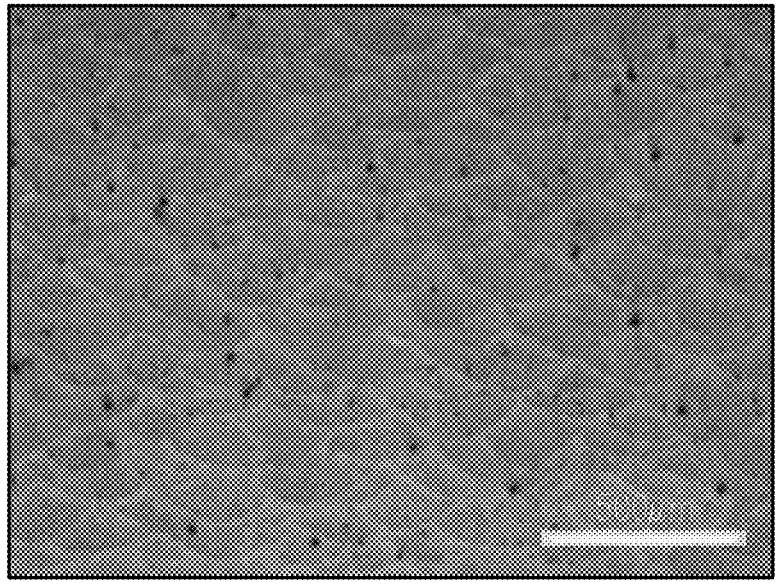
Fig. 27(b)
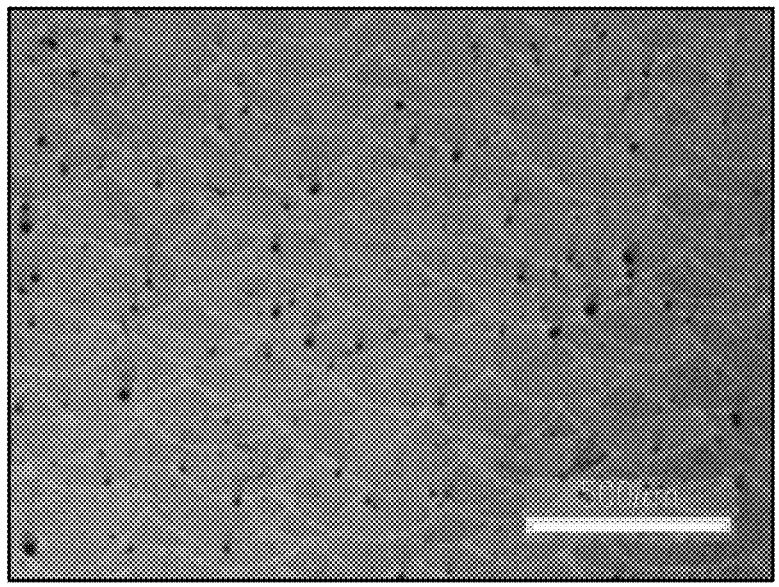

Fig. 29(a)
Fig. 29(b)
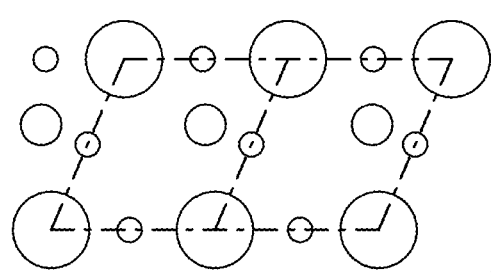
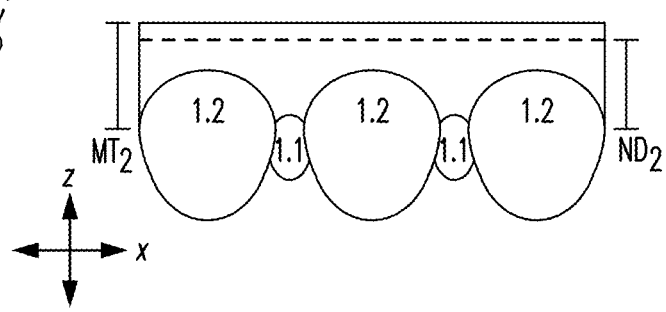
Fig. 29(c)
Fig. 29(d)
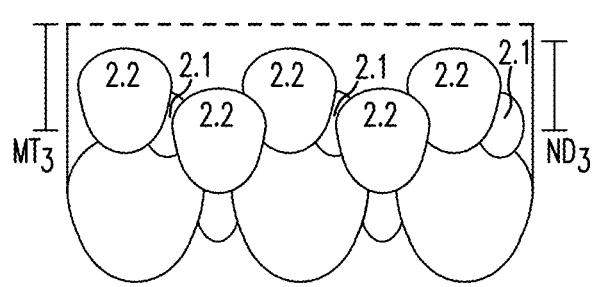
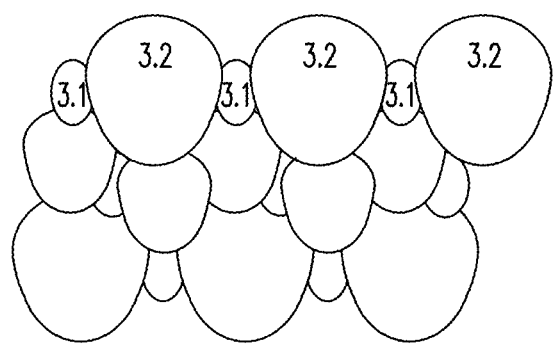

MULTILAYER PARAMETER-VARYING FUSION AND DEPOSITION STRATEGIES FOR ADDITIVE MANUFACTURING

FIELD OF THE INVENTION

The invention encompasses compositions and methods for designing or producing three-dimensional articles layer-by-layer, whereby the specific approach to build-up a region of a single layer by fusion, deposition of material, or other path-based process or non-path process that creates track-like geometries requires either differing track or track-like geometry, or track or track-like geometry printing parameters, within a region of a single layer or within adjoining regions of multiple layers, is disclosed. Employing this method, single layer or multilayer parameter-varying fusing and deposition strategies can be generated that reduce article fabrication time and/or improve article physical properties, in part by targeting a distribution of scan paths that satisfy covering problem overlap and/or dense packing criteria. Additionally, methods and compositions for designing or producing three-dimensional articles by altering the thickness of a material layer deposited during a print relative to the slice thickness or net displacement of a stage or of a material and/or energy-depositing print head, are disclosed. Employing this method can result in the reduction of article fabrication time and/or the improvement of printed article physical properties, where these results advantageous to printing are dependent on the print process, material properties, and feedstock properties employed during the print.

BACKGROUND

Additive manufacturing (AM), often called 3D printing, can be described as a process of building up a three-dimensional solid or porous article comprised of one or more materials by fusing, bonding, or otherwise attaching successive layers of the article to one another. The layers in AM are often represented conceptually or in a computer or drawing by a set of finite-thickness slices of a three-dimensional article, where each slice is most commonly the intersection between the article and one of a set of stacked finite-thickness Euclidean planes, where the planes are defined as those with normal vector in the chosen direction of build-up of the article. Slices can be defined by a different set of sections other than planes, but the sections generally maintain the property that when all sections of the article from the set are combined in specified order, the three-dimensional article is retrieved. By way of example, a non-planar set of slices might be the intersection between the article and a number of radially increasing hemi-spherical surfaces (the sections) where the increase in radius of curvature between each successive section is the radial thickness of the preceding section. In this case, the build-up direction at every point on the slice might be in the direction from the spherical-center of the section to the point (radially outward).

There are multiple AM article fabrication methods, including fused deposition modeling, stereolithography, selective laser sintering, binder jetting, material jetting, multi-jet fusion, powder bed fusion, directed energy deposition, laminated object manufacturing, and many others. In each of these methods, a certain type of printer is employed, where the printer is the machine or system of machines that constructs layers and successively fuses, bonds, or otherwise attaches these layers to one another in order to create a three-dimensional article. Generally, the printer and its components are controlled by a computer, where this computer has stored in its memory certain data representing instructions for the printer's hardware components on how to approximately produce each slice of a three-dimensional article and fuse, bond, or otherwise attach the layer represented by each slice to previous and successive layers. Those instructions are also generated by a computer (the same or different), where the latter computer contains a data-based geometric representation of a three-dimensional article, the capability (through software) to divide these geometric representations into slices, and the capability (through software) to issue the data representing the instructions, readable by one or more printers, to approximately produce and fuse, bond, or otherwise attach successive layers to one another.

Printers collectively are capable of fabricating objects from a wide variety of different materials, including by way of example polymers, thermoplastics, metals, ceramics, glasses, and composite combinations of any of these. Each type of printer is, however, generally targeted toward producing three-dimensional objects from a more narrow range of materials. For example, stereolithography printers generally print objects from photopolymers by first depositing a thin layer of photopolymer on a surface, and then exposing a region of that surface representative of a slice of the article at that layer to UV or other light in order to harden or solidify that region. The layering and exposure process is then repeated at least once, but generally a multitude of times, where each layer deposited builds the height of the article at every point in the build-up direction, and where each successive region exposed is in the approximate shape of a successive slice of the same three-dimensional article. Generally, the successive layers that comprise the article fabricated sit atop a build platform, shown in FIG. 1, that in turn sits atop a precision stage, and this precision stage is lowered a certain distance after each deposition step and exposure step, where this distance is roughly equal to the thickness of the layer of photopolymer deposited in each step.

Generally in printing, the approximate average thickness of each layer is roughly equivalent to the absolute value of the distance traversed by either; a) a stage, as in the case of stereolithography printing, or b) in some cases where a material or energy-depositing nozzle is used, between a given point on one slice or its representative layer n and the point on the successive slice or layer n+1 that is defined as the intersection between 1) a vector starting at the point on n and oriented in the build-up direction, and 2) the successive layer n+1. This approximate thickness for the entirety of each slice or layer, or at each point on a slice or layer, is generally called the layer thickness; in FIG. 1, by way of example for printing employing a stage, the layer thickness is shown as LT.

In material jetting processes, to fabricate a planar layer, a dispenser generally deposits a material, often in a suspension, slurry, liquid, gel, powder, or other form, in coordinated adjacent paths, often lines, such that the rough shape of the area covered by a multitude of these tracks of material is representative of a slice of the article. Material jetting printers might also deposit energy in addition to material, and they might deposit one track at a time or many, for example, by employing more than one nozzle, where different materials could be used in different nozzles.

Generally, the specific approach used to deposit many adjacent tracks of material (and/or energy) so as to form the rough shape defined by a slice of the article can be called the scan strategy for that slice or layer. The order of track production within a layer is not necessarily critical to the process, though a faster process usually results from fabricating nearest-neighbor tracks sequentially due to this approach tending to minimize the time expended for each layer in moving the print head or otherwise redirecting material or energy to produce tracks. The material deposited generally thickens or solidifies a short time after deposition of material or energy in the rough shape of its slice. The tracks deposited have a height that is very roughly equal to that of the layer thickness and are spaced in a fashion that is generally roughly consistent with their width, as shown in FIG. 2, where the spacing between adjacent track paths is often call the hatch spacing. As with a stereolithography process, a precision stage can used, but in contrast to stereolithography, a nozzle or nozzles, in order to deposit material for a successive layer, might also be raised in the build up direction by a distance approximately equal to the layer thickness at that point.

Binder jetting processes are in some ways similar to material jetting processes in that for each layer, adjacent tracks of material are deposited in the rough shape of a slice of a three-dimensional object representative of that layer, according to any of a number of scan strategies. However, in a binder jetting process, a thin layer of powdered material is first deposited across the entirety of a build area, and the material deposited in adjacent paths is a binding agent, or glue, that is cured or otherwise solidified in order to hold the powder particles in rigid relation to one another. The green article that is fabricated in successive layers is comprised of both powder particles and hardened binding agent.

Powder bed fusion and laser or other sintering processes are similar to binder jetting processes in terms of powder deposition, but in these processes, an energy source melts or sinters powder particles so that a solid layer is formed either from material that resolidifies after melting, or from partially melted (sintered) particles that are roughly fixed in space in rigid relation to one another. FIG. 3a illustrates two layers of a scan strategy that is commonly used in powder bed fusion and laser sintering processes, as well as other printing processes. In this case, as is often the case in the other processes just described, the direction of scan paths, where a scan path is defined as the one-dimensional path along which material is deposited or an energy source scans in order to form a track, can be rotated in a controlled fashion from layer to layer in order to produce desirable physical characteristics in fabricated articles, including by way of example increased isotropy of elastic properties, reduced porosity, or increased throughput/reduced costs of printing. FIG. 3b is a top-down image of scan tracks in a single layer of a powder bed fusion process printed according to the scan paths illustrated in FIG. 3a. FIG. 3c is an image of a section of an article fabricated employing the scan strategy depicted in FIG. 3a. Additionally, some powder bed fusion processes exist that are not path based, but instead pattern based in a similar fashion to stereolithography. In these processes, a pattern of energy is projected onto a broad area of the build surface as opposed to a small energy spot being rastered or scanned over the area.

Some past patents and research have discussed scan strategies that are claimed to be advantageous to printing in terms of improving article physical characteristics or improving economic and/or manufacturing considerations of printing. For example, U.S. Pat. No. 5,155,324 dated Oct. 13, 1992, discusses a selective laser sintering process in which over successive layers, scan lines that are parallel and anti-parallel within one layer are rotated a given amount in each successive layer. U.S. Pat. No. 7,569,174 dated Aug. 4, 2009, discusses a selective laser sintering process whereby each layer in an article is scanned by a laser once with higher energy, covering the entirety of the planar cross-section of the article at that slice, and then scanned at least one more time at relatively lower energy. The intent of this process is to anneal or further melt each layer of the article, and strength improvements up to 100% are reported.

Additionally, there are a number of patents that discuss compositions fabricated using specific scan patterns. Compositions are often linked to scan patterns due to the nature of building up a part layer-by-layer, and/or track by track. For example, when articles are fabricated with tracks that are produced by scanning in only one direction (and/or antiparallel to that direction), article strength, ductility, electrical conductivity, thermal conductivity, and other characteristics are typically increased in that direction, but decreased in other directions, particularly in directions near the two directions perpendicular to the scanning direction, though this is not a hard and fast rule. This change in article elastic, mechanical, and other physical properties is due to the local phase, bonding, and crystalline structure imparted by the elongated nature of scan tracks and the lamellar nature of layer-wise manufacturing. Grain boundaries and other types of chemical/microstructural boundaries tend to form at the edges of scan tracks, leading to substantial changes in elastic and transport phenomena as a function of the position and concentration of these boundaries. In the prior example of scanning all tracks in a single direction, no track boundaries are crossed by progressing in the scan direction (or antiparallel to it), leading to substantial anisotropy in physical properties.

There are also a small number of patents and research papers that discuss a specific scan strategy for which not only the angle, but also the relative position of scan lines in successive planar layers is specified. In this method, scan lines are "interleaved" between layers such that the scan lines in layer n+1 are placed at the midpoint between the scan lines in layer n, without rotation, as shown in FIG. 4. U.S. Pat. No. 6,596,224 discusses this method for a material jetting or fused deposition modeling process, stating that the surface finish of the article can be improved by employing such a method over about ~10 layers near the physical top of the article. U.S. Pat. No. 6,677,554 discusses this method for a selective laser sintering process, stating that the number of total scan lines and therefore the sum of the lengths of all scan lines can be reduced with this method, leading to an increase in article fabrication throughput, and possibly to an increase in article strength. The journal article: X. Su and Y. Yang, *Research on track overlapping during Selective Laser Melting of powders,* Journal of Materials Processing Technology 212, pp. 2074-2079 (2012), studies this method for a selective laser melting (powder bed fusion) process, for the stated purpose of avoiding nonuniform distribution of energy input.

Definitions:

Packing problem: A packing is a configuration (spatial arrangement) of nonoverlapping objects in a subregion of d-dimensional Euclidean space or d-dimensional curved spaces. A periodic packing in Euclidean space is one in which γ objects, called the basis, are contained within a unit cell of volume $v_U$ that is periodically replicated in space. The shape and symmetry of unit cell is defined by "d" lattice basis vectors b (not to be confused with the basis objects). The objects can be of arbitrary shape, including convex (e.g., circles, ellipses, spheres, ellipsoids, cylinders) and concave (e.g., star of David, crosses, stellated polyhedra and hyperbolic paraboloids) shapes. Polydisperse packings are those in which the objects have different sizes and/or shapes.

Binary packings are those that have two different sizes and/or shapes. Ternary packings are those that have three different sizes and/or shapes. Each object is configurationally defined by its coordinate r, which accounts for both its position and orientation; by way of example, in three dimensions, this coordinate r might include three spatial coordinates (x,y,z) representing object center of mass, and two angular coordinates (θ,φ) representing longitudinal and latitudinal displacements about the object center. A basic property of a packing is the packing fraction, which is the fraction of space occupied by the objects. The packing fraction of a periodic packing is the total volume of the γ basis objects within the unit cell divided by $v_U$. An efficient packing has a high packing fraction. The best packing has the highest packing fraction among all packings.

Covering problem: A covering is a configuration of overlapping objects that completely covers a subregion of d-dimensional Euclidean space or d-dimensional curved spaces. A periodic covering in Euclidean space is one in which γ objects, called the basis, are contained within a unit cell of volume $v_U$ that is periodically replicated in space. The shape and symmetry of unit cell is defined by d lattice basis vectors b (not to be confused with the basis objects). The objects can be of arbitrary shape, including convex (e.g., circles, ellipses, spheres, ellipsoids, cylinders) and concave (e.g., star of David, crosses, stellated polyhedra and hyperbolic paraboloids) shapes. Polydisperse coverings are those in which the objects have different sizes and/or shapes. Binary coverings are those that have two different sizes and/or shapes. Ternary coverings are those that have three different sizes and/or shapes. Each object is configurationally defined by its coordinate r, which accounts for both its position and orientation; by way of example, in three dimensions, this coordinate r might include three spatial coordinates (x,y,z) representing object center of mass, and two angular coordinates (θ,φ) representing longitudinal and latitudinal displacements about the object center. A basic property of a covering is the covering density, which is the total volume of the objects per unit volume. The covering density of a periodic covering is the total volume of the γ basis objects within the unit cell divided by $v_U$. An efficient covering has a low covering density. The best covering has the lowest covering density among all coverings.

Track cross section: The average of the shapes defined by the intersection of a surface, most simply a plane, and a single track of material, where the intersection is taken at various points along the scan path of the track, we define as a track cross section. Most simply, a track cross section is formed by the intersection of a track and a plane with unit normal parallel to the direction of track or scan propagation at that point, and where an average shape is taken by spatial averaging over a plurality of these intersections at different points along the track or scan path. For the sake of clarity, we will refer to track cross sections formed in this fashion as path-tangent track cross sections, recognizing however that the choice of the track-intersecting surface and its orientation are not essential to forming a track cross section, though a consistent choice of intersecting-surface and orientation is useful in identifying differences between tracks and in designing scan strategies. FIG. 5 includes images of several different path-tangent track cross sections from a laser powder bed fusion printer, where the difference in shape and size of the track cross sections is dependent on the printing parameters including but not limited to laser power and scan speed.

One or more track cross sections, with or without fixed angular orientation, can be used as a basis set for a covering problem solution. The same holds true for geometric approximations (the simplest being a cylinder) of one or more actual tracks in three-dimensions. Additionally, more simply, a packing consisting of one or more same-sized or differently-sized objects, most simply (but not limited to being) disks in two-dimensions and cylinders in three-dimensions, serving as a basis, respectively, in a two-dimensional or three-dimensional unit cell, can be thought of as representative of track cross sections in two dimensions or approximations of tracks in three dimensions, and therefore employed to generate scan strategies. In this way, a mapping exists being track cross sections, packings and scan strategies, and track cross sections, covering problem solutions and scan strategies.

Slice Thickness, Layer Thickness, Material Thickness, and Net Displacement: Generally, slice thickness, material layer thickness (powder layer thickness before energy or material deposition in printing processes involving powder beds), and the absolute value of net displacement of a stage or material- (and possibly energy-) depositing print head at each point, or for each slice or its representative layer, are all thought of as the same concept, called the layer thickness. Fundamentally though, slice thickness, material/powder thickness, and net displacement need not be the same; in particular, employing different values for the material thickness and net displacement in a print can yield positive benefits to printed part quality and the printing process, as we describe in detail later in this document.

The term slice thickness is used herein to refer to the thickness of a slice of a three-dimensional article in the vicinity of a given point on that slice, with "slice" as defined previously. We employ the term slice in reference to the design, whereas we generally employ the term layer in reference to the fabricated article. In this usage, the thickness of the material layer and the thickness of the slice are not necessarily the same, either in average or at a particular point.

The average material layer thickness of a single layer or the thickness local to a specific point in a layer can vary substantially, and it can vary significantly from the maximum height of the track. In FIG. 2, track height varies locally, with variations in height occurring periodically on the order of track width; this is also the case in a similar fashion for powder bed fusion printing, as may be seen in FIGS. 3b, 3c, and 5, and generally for all scan and track based, or similar, printing processes. Consequently, at a local level, the thickness of the layer or track of material deposited is not the same as the thickness of the slice: only the average deposited material thickness over many tracks and many layers is approximately the slice thickness. This latter statement is made under the assumption that the length scale represented in the design is approximately replicated by the printer in fabricating the physical article.

In powder bed fusion printing and other powder-based printing processes, the differences in the concepts of slice and layer thickness are also due both to the local variation in the thickness of the layer of powder deposited, which varies laterally on the order of a few powder particle diameters according to particle size and shape distribution, and in powder bed fusion to the fact that track depths tend to be much larger than slice thicknesses due to the practice of remelting previously melted layers in order to achieve near-full density fabricated articles. Further, as is described in this invention, the material thickness or powder thickness, defined simply as the average thickness of deposited material in the vicinity of a point (before binding, fusing, melting, sintering, or other print process is applied), does not need to be the same as the slice thickness or the average layer thickness. This is an important consideration from the perspective of track shape and therefore track cross section shape because varying the material thickness can alter track and track cross section shape.

Often, the material thickness is intended to be roughly constant across a layer of deposited material. Nevertheless, the thickness of a deposited layer is dependent on material characteristics and printer parameters, for example, in the cases where a powder shuttle is used to deposit or spread powder, the distance between the blade, wiper, roller, or other spreading tool on the shuttle and the built-up physical article height has a strong influence on powder thickness. This latter distance is often controlled by a stage, which during the process of printing a layer may move several times in or against the build-up direction of the article. Over the course of printing a layer, the net movement of this stage is one example of the net displacement. For a print process involving a powder bed and a stage, the net displacement at a given point is most similar to the slice thickness at that point. Critically, because powder may be deposited at any displacement of the stage, the powder thickness and the net displacement can be individually controlled, meaning that the net displacement (slice thickness) and powder thickness do not need to be the same. FIG. 6 is an example of this concept where slice thickness and net displacement are constant over the slice shown, and where a 35 um powder thickness is employed for 50 um net displacement (and 50 um slice thickness).

The material (or powder) thickness and slice thickness may also vary for an AM process with a print head and no stage, or with both a stage and a print head; the average thickness of material deposited in the vicinity of a point on a slice does not need to be the same as the net displacement of the print head at that same point. By way of example, a slice thickness that is constant across the slice from position x=0 to x=L could be employed for layer n, with average deposited material thickness varying linearly across that distance, with smallest material thickness to microns of material deposited on at x=0 and largest material thickness $t_L$ microns of material deposited at x=L.

Filling Strategies, Contours Scans, Support Structures, Print Lattices, and Others: Printers and printing that employ path, scan, and track based processes have the capability to employ different printing parameters to distinctly structurally different regions of an article, as defined on the scale of the article. Critically, while different print parameters can be employed within a single layer in order to implement the families of scan strategies that include; filling strategies, contour scans, support structures, print lattices, and others; different print parameters are not employed within the same strategy, and different strategies are employed across regions of the article defined by (larger) targeted article geometry rather than in a periodic, alternating, or other fashion defined on the (smaller) scale of scan tracks.

Contour scans are often employed on the surfaces of parts in order to: improve part surface finish, improve the geometric match between the fabricated article and the plan, image, or computerized data intended to be fabricated, or to reduce porosity around article surfaces, among other reasons. Multiple contour scan tracks can be placed side-by-side, but the number of such side-by-side tracks is often limited to one, two, or three.

Support structures are employed in order to prevent fabricated article warping, to conduct heat away from thermally isolated regions of the print, and to hold the article to the build platform, among other reasons. Support structures are often produced using evenly spaced single scans, with unprinted space between the scans, that produce a series of interlinked thin walls, spikes or columns. Distinctively, support structures are not meant to be part of a finished article and are nearly always cut away, dissolved away, or otherwise removed after printing.

Print lattices, not to be confused with the mathematical concept of lattice defined previously, are scaffolding-like structures that are composed of single three-dimensional units or voxels of space containing both printed and unprinted material, replicated many times over to cover a region of space spanning many voxels. Print lattices can be described as strut and node structures, in that they consist of nodes from which struts of printed material extend in various directions, connecting with other struts at other nodes. They can be generated with single scans like support structures, or each strut can be produced by multiple adjacent overlapping or nearly overlapping tracks.

Filling strategies are designed to fill space, and are distinct from the previous strategies in that they are intended to produce a solid region either with very low porosity, or with a stochastic porosity where pore sizes are roughly on the order of hatch spacing or smaller. Some examples of fill strategies are depicted in FIGS. 3a and 4. Fill strategies can also be employed to fill the struts and nodes of print lattices where those struts are not formed by single tracks. Additionally, the delineation between fill strategies and contour scans is somewhat blurred when larger numbers of contour scans are employed near the surfaces of printed articles. Further, some filling strategies and other strategies are termed skins, or other terms, implying that the lateral extent of such filling strategies is significantly greater than their thickness.

SUMMARY OF THE INVENTION

The present invention relates to additive manufacturing scan strategies, and related methods, systems, and compositions, and methods and systems for altering the thickness of a material layer deposited during a print relative to the net displacement of a stage or of a material and/or energy-depositing print head, and/or relative to the article slice thickness. The applications where this present invention is valuable include but are not limited to: 1) fused deposition modeling, 2) material jetting, 3) binder jetting, 4) powder bed fusion, 5) selective laser sintering, 6) multi-jet fusion, 7) directed energy deposition, 8) direct metal deposition, 9) Electron beam additive manufacturing, 10) arc plasma sintering additive manufacturing, and other additive manufacturing methods where generally defined scan paths and tracks are employed, and in additive manufacturing methods where material or energy deposition patterns over a more broad area generate periodic surface height variations similar to those exhibited by a series of tracks. Hereafter, discussions of tracks, track cross sections, scan strategies, and scan paths include both the additive manufacturing methods, systems, and compositions where scan paths and tracks are employed, and the cases where material or energy deposition patterns over a broader area generate surface variations similar to those exhibited by a series of tracks.

In one embodiment, the present invention contemplates an additively manufactured composition in which track geometry or track cross section geometry is substantially similar for all or nearly all of the scan tracks in a region of a printed layer, but different for all or nearly all of the tracks in an adjoining region of a prior or successive layer. In one embodiment, the present invention contemplates an additively manufactured composition in which more than one shape or size of track or track cross section is employed in manufacturing a layer, layers, or portions thereof, and where the configurations of the tracks or track cross sections are targeted to differ in coordinated fashion within each layer, layers, or portions thereof. In one embodiment, the present invention contemplates an additively manufactured composition in which the configurations of tracks or track cross sections consisting of a plurality of different shapes or sizes in a region of an article are specified with positions according to crystallographic point patterns, where those tracks cover a unit cell of such a pattern in a fashion such that unprinted area in the cell is not present in sizes larger than the largest track (or its cross section), and where parts of at least two adjacent cells are present in the part of each layer contained within the region.

In one embodiment, the present invention contemplates an additively manufactured composition in which a plurality of different sized and/or shaped tracks or track cross sections are used in a solution to a two (for track cross section) or three (for tracks) dimensional covering problem, and where the configurations of the tracks or track cross sections in the solution are used to define the relative position of scan paths across a region including parts of or all of one or more successive layers in a multi-layer scan strategy.

In one embodiment, the scan tracks discussed in paragraphs two and three of this "Summary of the Invention" section in a region encompassing parts of two or more successive layers are all or nearly all parallel or anti-parallel. In one embodiment, the scan tracks discussed in paragraphs two and three of this section are in a region of a given layer all or nearly all rotated by a specific angle relative to those in an adjoining region of the previous layer. In one embodiment, the scan tracks discussed in paragraphs two and three of this section are in a region of a given layer all or nearly all parallel or anti-parallel relative to those tracks in an adjoining region of the prior layer, but the tracks in an adjoining region of the successive layer are rotated by a specified angle. In one embodiment, the scan tracks discussed in paragraphs two and three of this section are ordered chronologically, for each layer that is partially or entirely contained within a region of an article, such that either adjacent tracks or non-adjacent tracks are printed successively.

In one embodiment, the present invention contemplates a method of designing scan strategies where track geometry or track cross section geometry is targeted to be substantially similar for all or nearly all of the scan tracks in a region of a printed layer, but different for all or nearly all of the tracks in an adjoining region of a prior or successive layer. In one embodiment, the present invention contemplates a method of designing scan strategies using more than one shape or size of track or track cross section where the configurations of the tracks or track cross sections are targeted to differ in coordinated fashion for scan tracks in a region of a printed layer. In one embodiment, the present invention contemplates a method of designing scan strategies where the configurations of tracks or track cross sections consisting of a plurality of different shapes or sizes in a region of an article are specified with positions according to crystallographic point patterns, where those tracks cover a unit cell of such a pattern in a fashion such that unprinted area in the cell is not present in sizes larger than the largest track (or its cross section), and where parts of at least two adjacent cells are present in the part of each layer contained within the region.

In one embodiment, the present invention contemplates a method of designing scan strategies where a plurality of different sized and/or shaped tracks or track cross sections are used in a solution to a two (for track cross section) or three (for tracks) dimensional covering problem, and where the configurations of the tracks or track cross sections in the solution are used to define the relative position of scan paths across a region including parts of or all of one or more successive layers in a multi-layer scan strategy.

In one embodiment, the scan tracks discussed in paragraphs five and six of this "Summary of the Invention" section in a region encompassing parts of two or more successive layers are all or nearly all parallel or anti-parallel. In one embodiment, the scan tracks discussed in paragraphs five and six of this section are in a region of a given layer all or nearly all rotated by a specific angle relative to those in an adjoining region of the previous layer. In one embodiment, the scan tracks discussed in paragraphs five and six of this section are in a region of a given layer all or nearly all parallel or anti-parallel relative to those tracks in an adjoining region of the prior layer, but the tracks in an adjoining region of the successive layer are rotated by a specified angle. In one embodiment, the scan tracks discussed in paragraphs five and six of this section are ordered, for each layer that is partially or entirely contained within a region of an article, such that either adjacent tracks or non-adjacent tracks are printed successively.

In one embodiment, the present invention contemplates a method of additive manufacturing where the slice thicknesses or net displacements for each layer within a region of an article are varied in order to alter the average geometric shape and/or area of tracks (and/or track cross sections) within the region. In one embodiment, the material thickness of a layer or layers within a region of an article is different (either greater or lesser) from the slice thickness or net displacement, and where the slice thickness or net displacement for the parts of each layer encompassed within the region may be either the same or different from that of other layers within the region. In one embodiment, the thickness of material deposited for a layer or layers within a region of an article for the embodiments discussed in this paragraph thus far are different (either or greater or lesser) from the slice thickness or net displacement for the parts of the layer or layers in that region in such a fashion as to alter the average geometric shape and/or size of scan tracks within the parts of the layer or layers encompassed by the region.

BRIEF DESCRIPTION OF THE FIGURES:

FIG. 1a, is repeated, where each successive region exposed and layer deposited builds the height of the article at every point in build-up direction in the approximate shape of a successive slice of the same three-dimensional article.

FIG. 6a is a schematic illustration of an example of a powder based process to define the material thickness (MT) used in the AM production of an article. The build platform is lowered by a precision stage by 35 um to form a gap in the powder bed and a roller infills powder from a separate supply into the gap. This defines the material thickness as 35 um.

FIG. 6b is a schematic illustration of motion of the build platform in a powder based AM process immediately following powder deposition, as described in FIG. 6a. Further displacement of the build platform prior to the consolidation of the powder can be used to define a net displacement (ND) greater than, equal to, or less than the material thickness (MT).

FIG. 6c is a schematic illustration of a powder based process in which the net displacement (ND) and material (powder) thickness (MT) have been independently controlled and can, but need not, differ. The net motion of the precision stage in aggregate between all steps prior to consolidation of the powder, FIG. 6a and FIG. 6b, defines the total net displacement, in this case as 50 um, while the material thickness is 35 um as defined by the layering process shown in FIG. 6a.

FIG. 18*a*, respectively, of a circular scan strategy implementation of the covering problem solution unit cell as described in FIG. 16. Scan paths are cylindrically symmetric to the previous layers n and n+1 with AM track geometry parameters assigned consistent with layer n and alternately relative to layer n+1.

FIG. 27a is an image of track cross sections, taken 45 degrees off of unit normal, of a part printed in an aluminum alloy with a two track geometry scan strategy similar to that described for FIG. 26, except in this case with 375 W laser power and hatch spacing of 220 um, where the smaller tracks are printed employing a smaller beam waist and faster scan speed relative to the larger tracks.

FIG. 27b is an image of track cross sections, taken 45 degrees off of unit normal, of a part printed in an aluminum alloy with a single track scan strategy employing 375 W laser power, a gaussian beam waist of 46 um, 220 um hatch spacing, and scan speed of 1311 mm/s. In this strategy, scan paths are rotated by 90 degrees every layer.

FIG. 28b is a cross sectional image of a part printed in nickel superalloy by laser powder bed fusion employing a one track "interleaved" scan strategy similar to that described for FIG. 23. In this case, a laser power of 269 W, hatch spacing of 140 um, a net displacement and powder thickness of 50 um, and a gaussian beam waist of 55 um were used to generate the tracks, where the total deposited energy per unit mass was the same as for those parts shown in FIGS. 28a and 28c. Measured porosity for this part was 0.50%, lower than that measured for the part shown in FIG. 28c but far higher than that measured for the part shown in FIG. 28a.

FIG. 29a is an illustration of a unit cell consisting of three different object geometries generated from different AM track geometry parameters most consistent with powder bed fusion, laser sintering, or a binder jetting printing process. In this case, one large, two medium, and three small objects are present in each unit cell, and this is the minimum basis possible. Several slice thicknesses are possible for this configuration; consequently, the basis vectors $(b_1, b_2)$ are given in terms of the length of the x-axis parallel vector as (1.0, 0.0), (0.44, 1.03). The x-axis is directed to the right, and the z-axis upwards.

FIG. 29b is an illustration of a single layer onto which material for the successive layer has been deposited, where the net displacement $ND_2$ in this case is less than the material thickness $MT_2$ for this slice. The scan strategy employed is designed from a covering problem solution employing multiple track object geometries and sizes as shown in FIG. 29a, and includes alternating order of track printing, different net displacements between slices, and multiple material thicknesses that are either greater than or equal to the net displacement within a single slice, depending on the slice. The labels "1.1" are meant to indicate that the smaller tracks are printed first, with the larger tracks, labeled "1.2", immediately after. This strategy could be applied, with some modification, in any printing process, but track cross section geometry is in this case drawn to reflect tracks generated employing AM track geometry parameters for a powder bed fusion, laser sintering, or binder jetting process, where for the latter case a scaling-up of the unit cell beyond what is depicted in this FIG. 32 ight be advantageous in preventing overdeposition of binder.

FIG. 29c is an illustration of the layer printed after the deposition of material shown in FIG. 29b, and the deposition of material for the printing of the next layer. In this case, the smaller tracks (labeled "2.1") are printed first, then then larger tracks (labeled 2.2). For the next layer, the material thickness $MT_3$ and the net displacement $ND_3$ are the same.

FIG. 29d is an illustration of the layer printed after the deposition of material shown in FIG. 29c. As in previous layers in this example, the smaller tracks (labeled "3.1") are printed before the larger tracks (labeled "3.2"). For articles fabricated this strategy, the x-axis component of the shear strength would be increased relative to a scan strategy with tracks laid one on top of the other due to the large z-axis span of tracks both within layer and across layers. This strategy might be well-suited to binder jetting, with the order of printing smaller and larger objects within each layer reversed, where higher yield strength was desired along the direction of scanning (into the page) and relatively higher shear strength was desired in and about the x-axis. Incorporating rotations every other layer would increase yield strength and shear strength in the x-axis direction while decreasing yield strength in the direction of scanning.

FIG. 32b is a cross sectional image of a part printed in stainless steel by laser powder bed fusion employing a one track "interleaved" scan strategy similar to that described for FIG. 23. In this case, a laser power of 252 W, hatch spacing of 140 um, a net displacement and powder thickness of 50 um, and a gaussian beam waist of 55 um were used to generate the tracks, where the total deposited energy per unit mass was the same as for those parts shown in FIGS. 32a and 32c. Measured porosity for this part was 0.56%, lower than that measured for the part shown in FIG. 32c but far higher than that measured for the part shown in FIG. 32a.

DESCRIPTION OF THE INVENTION

Figures 1A, 1B:
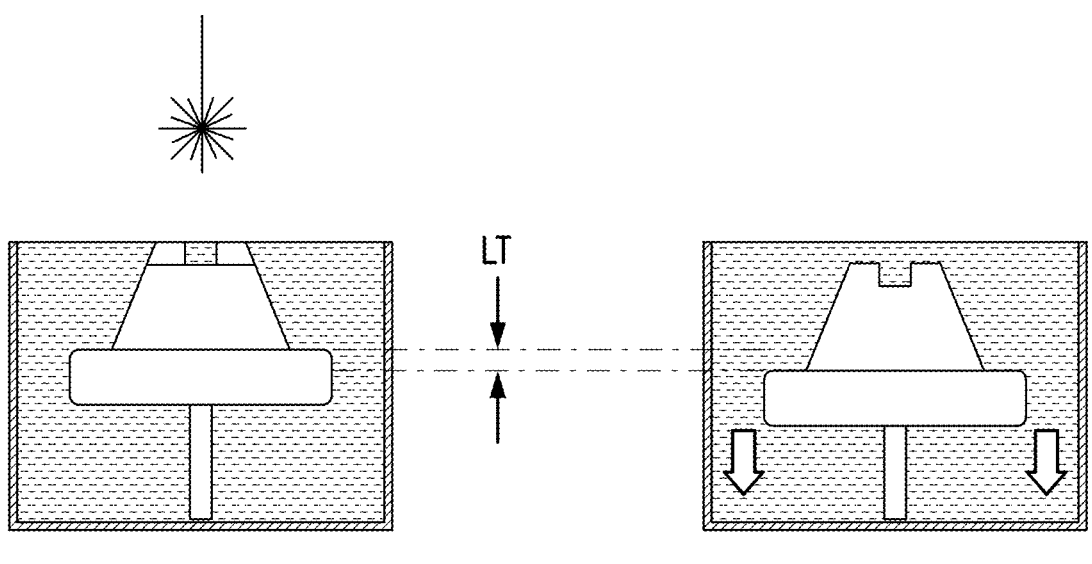
FIG. 1a is a schematic view of a conventional stereolithography apparatus, demonstrating the standard layering and exposure process. By way of example, a build platform is mounted upon a precision stage placed within a bath of photocurable polymer. The build platform is positioned such that a thin layer of uncured polymer, comparable to the layer thickness (LT) to be built-up, is deposited on a surface and subsequently exposed to an energy source in an area representative of a slice of the article to selectively harden or solidifying the material.
FIG. 1b is a schematic drawing of a build platform in a stereolithography apparatus, as described in FIG. 1a, being lowered a similar distance (LT) to produce a new layer of uncured polymer. This exposure and layering process, shown here and within

Systems, processes, and compositions of matter are described that employ the principal of varying track and track cross section shape, size, and position within a single layer and across different layers in order to increase printer speed and throughput (decrease print cost), to decrease fabricated article porosity, to improve fabricated article strength and other desirable physical characteristics, and to improve print reproducibility. Additionally, systems and processes are described in which material thickness and net displacement are individually controlled and are made to differ over single or multiple layers, resulting in changes to track and track cross section shape, size, and position, in order to increase printer speed and throughput (decrease print cost), to decrease fabricated article porosity, to improve fabricated article strength and other desirable physical characteristics, and to improve print reproducibility. The inventions contemplated herein are applicable for any AM or 3D printing process where a track of material and/or scan path is generated or employed, or where surface height variations are produced in a layer-wise fashion that are similar to those exhibited by a series of tracks, including but not limited to fused deposition modeling, material jetting, binder jetting, powder bed fusion, selective laser sintering, multi-jet fusion, directed energy deposition, direct metal deposition, electron beam additive manufacturing, arc plasma sintering additive manufacturing, and the applicability of the inventions contemplated herein is not limited to a single or to a small number of materials employed in the aforementioned track and scan path based printing processes and printers and for those processes and printers producing similar layer-wise surface variations; rather, the inventions are expected to be advantageous in the use of all or nearly all such materials, including in the use of composite materials and multi-material printing.

The benefit of the inventions described herein are obtained by altering AM track geometry parameters {P} and feedstock parameters {f} in order to implement targeted scan strategies and material deposition methods that are more efficient in deposited energy usage and/or time of material deposition, curing, melting, bonding, hardening, sintering, or fusing than other methods, and that generate compositions linked to those strategies with advantageous physical properties including but not limited to increased ductility, strength, isotropy (or anisotropy), fatigue resistance, thermal conductivity, electrical conductivity, surface roughness, and others. AM track geometry parameters {P} include but are not limited to; scan speed of energy deposition along track path or scan speed of material- and/or energy-depositing print head, total amount of energy deposited per unit time or total mass of material deposited per unit time, average slope of the surface upon which a scan track is being produced, parameters controlling powder or material thickness and volume of material deposited, net displacement, parameters controlling compaction of material, area of space over which energy or material is deposited when producing a track, shape of the space over which energy or material is deposited or shape of the nozzle, temperature of the area or build platform over which printing is occurring, temperature to which feedstock material is heated before deposition, velocity of gas flow over the surface of the build, and many others. Feedstock parameters {f} include but are not limited to; temperature-dependent viscosities of materials, melting temperature of materials, flow characteristics of materials (e.g., shear thinning of shear thickening), packing fraction of material in powder form (tap packing fractions and others), loading of particles in suspension, particle sizes, shapes and surface roughnesses for powders and particle suspensions, specific heat of materials, plasticity of materials, and many others.

Critically, the scan paths describing the motion of the energy deposition or of material or energy-depositing print head, including the local curvature or angle of the tracks (both relative to prior and successive layers and relative to a global coordinate system), the order in which tracks are printed, the hatch spacing, and related directional variables, are not included in the set of AM track geometry parameters {P} or feedstock parameters {f}. This is because these components do not tend to change track (or track cross section) geometry parameters much, but are rather indicators of where tracks will be fabricated. It is of note that in some printing processes, including but not limited to powder bed fusion and selective laser sintering, hatch spacing and the order of track printing within a layer in particular can have some effect on track geometry due to the creation of denudation zones and other phenomena; however, in general, changes in these parameters over the phase space of filling hatches tend to elicit relatively small, if measurable within error, changes in track geometry.

Summary of select distinctions from prior art. The following distinctions are not meant to be an exhaustive list, but rather a summary of a few important contrasts distinguishing this invention from prior art.

Additive manufacturing that employs track-based geometries is almost always conducted on a layer-by-layer basis, where scan strategies within any given layer are designed in order to produce desirable physical and geometric properties for that layer rather than designed in concert with designing the strategies for prior or successive layers, except insofar as global rotations of path direction or paths near article edges are considered. Even in the case of print lattices, the scan strategies employed to fabricate the struts and nodes are generally formulated with input only from data concerning the layer in question, rather than with information about scan strategies in prior or successive layers. This approach, among other benefits, provides the opportunity for parallel computation (where each layer's scan paths are computed simultaneously) in computer-generation of scan strategies.

Figure 4:
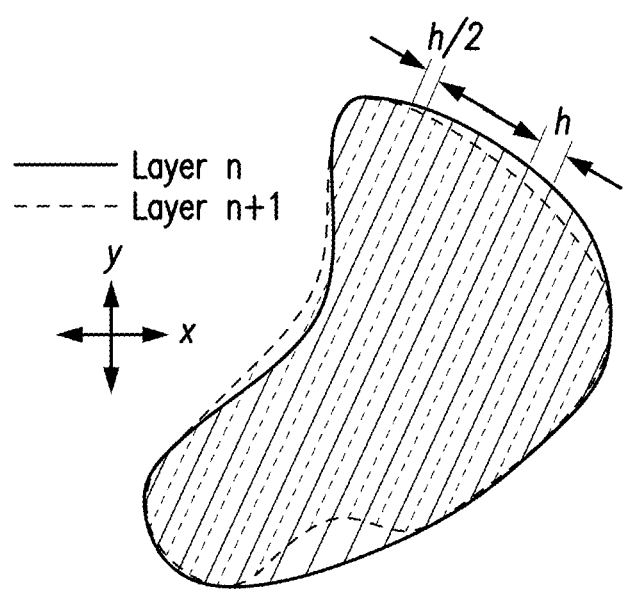
FIG. 4 is a schematic drawing illustrating a specific implementation of a scan strategy as described in FIG. 3a. In this method, the positions of scan paths are defined both within a given layer and relative to successive layers such to achieve an "interleaved" pattern. For example, in layer n, a multitude of parallel, adjacent scan lines are separated by hatch spacing h, representing the area fill of the slice of the article. The fill scan lines in successive planar layers, layer n+1, likewise are separated by hatch spacing h but are translated laterally relative to the prior layer by a distance equal to half of the hatch distance, placing the scan lines of layer n+1 at the midpoint between the scan lines in layer n.
Figure 5:
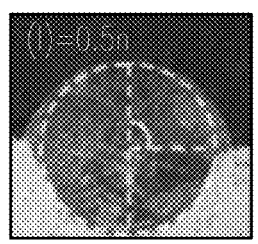
FIG. 5a is an image of the path-tangent track cross section of a stainless steel scan line printed by laser power bed fusion with a laser power of 50 W and laser scanning speed of 60 mm/s. Reproduced from I. Yadroitsev, A. Gusarov, I. Yadroitsava, and I. Smurov, *Single track formation in selective laser melting of metal powders*, J. Mater. Process. Technol. 210, pp. 1624-1631, 2010.
FIG. 5b is an image of the path-tangent track cross section of a stainless steel scan line printed by laser power bed fusion with a laser power of 50 W and laser scanning speed of 120 mm/s. It is of note the changes of the shape and size of the cross section, relative to FIG. 5a, due to the increase of scanning speed. Reproduced from I. Yadroitsev, A. Gusarov, I. Yadroitsava, and I. Smurov, *Single track formation in selective laser melting of metal powders*, J. Mater. Process. Technol. 210, pp. 1624-1631, 2010.
FIG. 5c is an image of the path-tangent track cross section of a stainless steel scan line printed by laser power bed fusion with a laser power of 300 W and laser scanning speed of 800 mm/s. The shape of the cross section is elongated compared to FIG. 5a and FIG. 5b. Reproduced from C. Kamath, B. El-dasher, G. F. Gallegos, and W. E. King, and A. Sisto, *Density of additively-manufactured, 316L SS parts using laser powder-bed fusion at powers up to 400 W*, Int. J. of Adv. Manuf. Technol. 74, pp. 65-78, 2014.
FIG. 5d is an image of the path-tangent track cross section of a stainless steel scan line printed by laser power bed fusion with a laser power of 300 W and laser scanning speed of 1500 mm/s. As shown in comparison with FIG. 5a-5c, aspects of the shape and size of the cross section of resolidified material, including but not limited to the circularity, contact angle, width, amount of material buildup, and depth, are dependent on the printing parameters including but not limited to laser power and scan speed. Reproduced from C. Kamath, B. El-dasher, G. F. Gallegos, and W. E. King, and A. Sisto, *Density of additively-manufactured, 316L SS parts using laser powder-bed fusion at powers up to 400 W*, Int. J. of Adv. Manuf. Technol. 74, pp. 65-78, 2014.
Figure 5:
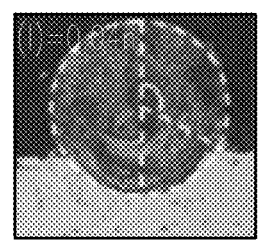
Figure 5:
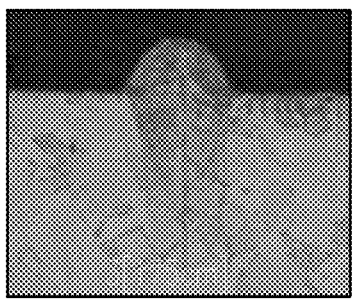
Figure 5:
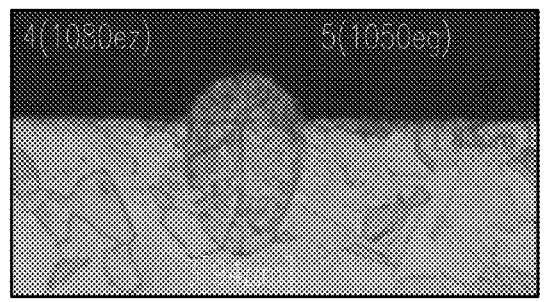
Figures 6A, 6B, 6C:
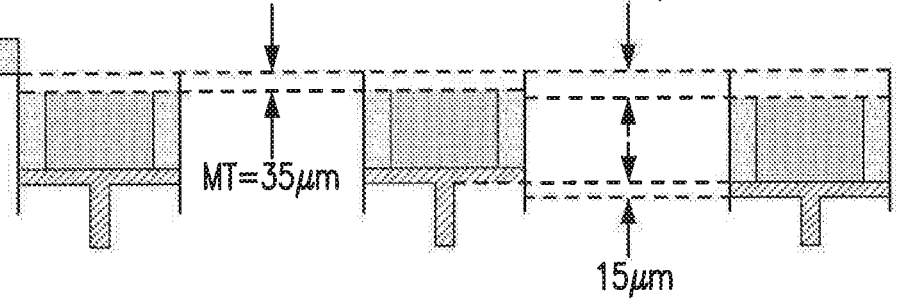

The interleaved layer filling strategy discussed in U.S. Pat. Nos. 6,596,224 and 6,677,554 is an exception, in that the direction of scan paths in this strategy in layer n is the same as the paths in either the prior (n−1) or subsequent (n+1) layer, and the positioning of the paths in layer n is halfway between that of the paths in either the prior or subsequent layer, as illustrated in FIG. 4. In this case, however, as in other cases, multiple AM track geometry parameters are not employed within the same filling strategy; rather, the same AM track geometry parameters are employed across a plurality of layers, even though the position of scan paths in each layer is dependent on the paths in the layer above or below.

From a crystallographic perspective, scan strategies employing a single set of AM track geometry parameters consist of the periodic replication of a unit cell with only one object contained within. Such strategies can be described mathematically by a lattice with a basis of one. In two dimensions, it is well-known to those knowledgeable in crystallography that there are only five families of such lattices, and in three dimensions only fourteen. In the inventions concerning covering and scan strategies discussed within this patent, any scan strategy or printed composition that can be described, in terms of a basis of AM track geometry parameters, by a lattice with basis one, is excluded; rather, the inventions require the application of different AM track geometry parameters within the same strategy, therefore requiring a unit cell with a basis greater than one.

Specifically, the methods and compositions inventions concerning covering and scan strategies require within a strategy that: 1) the tracks or track cross sections employ different AM track geometry parameters, thereby usually generating different track geometries, either within a single layer or across a plurality of successive layers, 2) the tracks or track cross sections can be characterized, according to their associated AM track geometry parameters or track geometries, by a unit cell, described in Euclidean or other geometric space, with a basis of no less than two, 3) where the printed tracks within the unit cell cover the space of the cell in the sense that no areas (volumes) of unprinted material are present larger than the largest track cross section (track), and 4) where portions of or all of at least two adjacent unit cells are present in each layer in regions to which the strategy is applied.

The requirement for the presence of elements of at least two adjacent unit cells is meant to exclude printing where different single-basis lattice strategies are applied to different regions within a layer or across layers. Prior art demonstrates that different scan strategies are often applied to different regions within a layer, for example, where a print lattice strategy is employed in the center of the layer, where a contour scan strategy is employed on the outer edge of the layer, and a filling strategy is employed in between. One could describe that layer or a substantial portion of it and any similar prior or successive layers by a single unit cell with a large basis; however, elements of at least two such cells would not be present within each layer. The restrictions requiring that the tracks within a unit cell form a cohesive solid within the region of the cell, without unprinted material of the size of the largest track or larger, are intended to exclude unit cells in print lattices or similar periodic structures where much or a majority of the material is unprinted. Roughly put, the inventions apply to filling strategies, including the filling of contours that consist of multiple adjacent scan tracks, print lattices with struts that are not composed of single scan lines, skins, and other such printed structures.

Additionally, the inventions concerning covering and scan strategies include the cases where a non-periodic or quasi-crystalline application of AM track geometry parameters, applied either in the form of the printing parameters or the placement of tracks in space, is employed within a filled region of printed space.

With respect to layer thickness, prior-art does not distinguish between slice thickness, material thickness, and net displacement, and where observations (if any) are made toward such a distinction, they are viewed as negatively or neutrally impacting fabricated article quality, printer speed, or other print or article characteristics. The inventions discussed herein describe a view of additive manufacturing in which these concepts are considered different and a method of fabricating layers where some or all of these three are intentionally and controllably made to differ from one another, in many cases producing results advantageous to printing. In particular, material thickness and net displacement are introduced as independent AM track geometry parameters, and the modification of these parameters independently via the methods discussed herein produce results advantageous to printing.

Scan paths derived from a plurality of track cross section shapes and/or sizes. When considering the melting, sintering, fusing, or otherwise binding (hereafter all included in the terms "fusing" or "fused", unless otherwise specified) of powder particles to one another and when considering the solidification or hardening (also referred to as "fusing" or "fused", for the sake of simplicity, unless otherwise specified) of a suspension, slurry, liquid, gel, curable polymer or other medium (hereafter all included in the term "slurry", unless otherwise specified) due to targeted energy, binding agent, or material deposition, re-melting, re-sintering, re-fusing, or re-binding (hereafter all included in the terms "re-fusing" or "re-fused", unless otherwise specified) of particles or slurry melted during the processing of a preceding slice is necessary to fabricate articles of low porosity, and to ensure that pockets of unmelted, unsintered, unfused, unhardened, unsolidified, or unbound ("hereafter all included in the terms "unfused", unless otherwise specified) particles or slurry does not remain after printing. There are at least two general reasons for this requirement. The first is that a scan or track based print process generally creates tracks that do not tile space, meaning that any scan strategy that did not employ sufficiently overlapping tracks, where overlapping tracks result in re-fusing in the regions of intersection of a plurality of tracks, would result in unfused particle or slurry, or pockets devoid or partially depleted of particles or slurry, in the spaces between tracks. The second general reason is that scan and track based printing produces tracks that vary stochastically in their local geometry, meaning that there is substantial variation in track width, height, depth, and surface structure over the length of a track, where the degree of stochastic variation is dependent on controlled variables such as the print process employed, printing parameters, feedstock parameters, and other variables, as well as uncontrolled variables. Consequently, if a scan strategy is not designed with sufficient overlap, then in the neighborhood of the border of a track at certain points along track length, local variation in track geometry will result in a lack of particle or slurry fusing.

Overlap is necessary to reduce the volume of space in an article in which there is a lack of fusing, and it is necessary to produce low porosity and nearly-porosity-free parts. However, overlap is inefficient, in that energy or time is committed to re-fusing particles or slurry that were previously fused. Therefore, scan strategies that reduce or eliminate areas of overlap where those areas are not needed to ensure the fusing of particles or slurry (termed excess overlap) are more efficient in terms of the use of energy and time. Generally speaking, employing scan strategies that involve tracks or track cross sections of different geometry (size, shape, surface properties) allows for the reduction of excess overlap compared to what is possible with tracks or track cross sections of only one geometry.

It is important to note that neither the average geometry nor the average volume of fused track produced, considering the space of AM track geometry parameters and feedstock material (powder or slurry), is generally precisely linearly dependent on the amount of energy or time spent producing the track. It can be useful therefore to define for each printer a set of scalar track efficiency functions $\{T_j(P^j)\}$, in units of track volume printed per unit time, track volume printed per unit energy, track cross section area printed per unit time, or track cross section area printed per unit volume, where a set of different functions exists for each printer in terms of the feedstock material (powder or slurry), indexed "j", and dependent on a feedstock-specific number "$I_j$" of AM track geometry parameters $\{P^j_i\}$, i=1 ... $I_j$, specific to that printers capabilities and the feedstock. More generally, size characteristics representing the geometric shape of a track or track cross section can be defined for a given a set of printer hardware and feedstock material, where these characteristics are also dependent on AM track geometry parameters. An example of size characteristic functional definition can be found in the journal article: C. Kamath, B. El-dasher, G. F. Gallegos, and W. E. King, and A. Sisto, *Density of additively-manufactured,* 316L *SS parts using laser powder-bed fusion at powers up to* 400 *W,* Int. J. of Adv. Manuf. Technol. 74, pp. 65-78, 2014, where 316 Stainless Steel tracks are produced according to varying the AM track geometry parameters laser speed and laser power, with fixed other parameters such as a layer thickness of 30 microns and a laser spot size of about 63 microns, and where track height, track width, and track depth are measured in terms of the two variable parameters.

Employing the above-described AM track geometry parameter dependent efficiency function, single or multi-layer scan strategies depicted in three dimensions in terms of overlapping tracks or in two dimensions in terms of track cross sections may be directly compared on the basis of energy or time efficiency. Additionally, because excess overlap is undesirable in efficiency terms, given a specific set of printer hardware, feedstock material, and AM track geometry parameters that produce one or more track geometries, better covering problem solutions for those track geometries will tend to be representative of more time and energy efficient scan strategies. Further, insofar as a family of denser packings of objects of the same or similar geometry to such tracks can be used to generate covering problem solutions, the density of such packings will tend to correlate positively with the time and energy efficiency of scan strategies generated from them. FIG. 7 illustrates an example of an efficient scan strategy based on a covering problem solution derived from a dense binary packing of disks. In this example, the objects' track cross sections are approximations of track cross sections produced using laser powder bed fusion.

For a given printer, considering "J" feedstocks (where the integer J>1 for multi-feedstock or multi-material printing) and for each a number "$K_j$" of parameter sets $\{P^j_i\}_k$, k= 1 ... $K_j$, the function values $T_j(\{P^j_i\}_k)$ can be used as weights in a covering problem posed in a variable unit cell with lattice basis vectors b and volume $v_U(b)$, and a basis of objects numbering $\Sigma K_j$ tracks or track cross sections (where the sum $\Sigma$ runs j=1 ... J), and in which each track or track cross section object exhibits geometry corresponding to its parameters $\{P^j_i\}_k$. Labeling each object $O_{j,k}$ by its feedstock index "j" and parameter set index "k", a configurational coordinate $r_{j,k}$ and area or volume $v_{j,k}$ for that object can be defined, where most simply the position components of the configuration $r_{j,k}$ would correspond with the scan path of the material- and/or energy-depositing print head or other AM printer material or energy source. The weighted covering problem may be written as a constrained optimization problem with objective:

$$\min_{\{r_{j,k}\}} \frac{1}{v_U(b)} \sum_{j,k} T_j(\{P^j_i\}_k) v_{j,k}$$

where the minimization of the objective function over the object configurations $r_{j,k}$ and basis vectors b is subject to the constraint that the entire volume of the unit cell defined by basis vectors b is covered by the objects $O_{j,k}$. The covering might also be a double, triple, or greater multiple covering where the unit cell is covered an integral number of times by the objects, and other constraints could be placed as well. By way of example, it might be that the precise geometry (and area or volume $v_{j,k}$) of the objects is somewhat dependent on the other parameters $\{P^j\}_k$ of the other objects in the unit cell, or even their relative configurations; if any such configuration dependence is known, it might be advantageous to constrain object configurations to the phase space for which it is known. It is important to note, however, that knowledge of any relative configurational dependencies (or other dependencies) is not necessary for the development of viable scan strategies, even though in some cases such knowledge might result in scan strategy improvements.

It is sometimes advantageous to measure average track geometry for a given feedstock in an environment that is similar to actual print conditions. This approach may include but is not limited to: a) including in the measurement of average track geometry those tracks that are printed on top of other tracks, rather than tracks where material is deposited on a smooth surface, b) if multiple feedstocks are to be employed in a print, generating tracks of each individual feedstock printed on layers composed of relative compositions in ranges similar to those targeted in the printed article, thereby printing in conditions of elastic stress, thermal conductivity, and where applicable, electrical conductivity and other physical properties, are similar to those in the printed articles, c) where the order of printing of tracks might not be chronological according to adjacent tracks, measuring average track geometry according to the ordering to be used, and d) where tracks of differing average geometry are to be present in the printed article, measuring the geometry of each set of tracks produced with a given set of track geometry parameters $\{P^j\}$k in proximity to those of other tracks (with differing "j" or "k" index) in a fashion as similar to projected printed article conditions as reasonably possible.

By way of example, when considering the two track geometries corresponding to the path-tangent track cross sections depicted in the unit cell shown in FIG. 7, it might be advantageous to measure the average geometry of the larger tracks by printing those tracks on top of a layer (or more than one layer) of the smaller tracks, and vice versa.

Figure 7A:
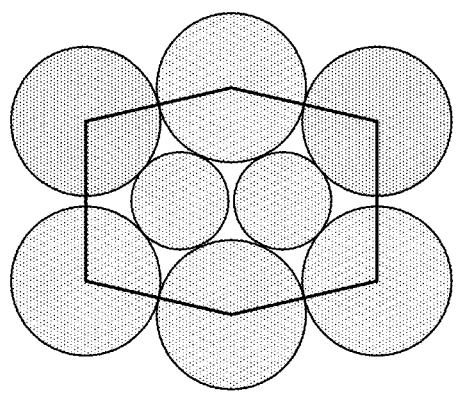
FIG. 7a is a unit cell of a dense packing of binary disks, from which a multi-parameter scan strategy can be derived.
Figure 7B:
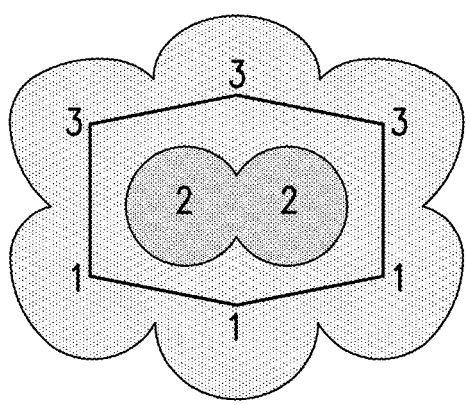
FIG. 7b is a covering problem solution for three different sized and shaped objects with fixed angular orientation and in a 2:1:1 ratio with two larger objects and one each of the smaller two objects (mirror images of one another) per unit cell. In this case the objects' geometries are meant to represent path-tangent track cross sections for tracks generated from two distinct sets of AM track geometry parameters $\{P^j_{i}\}_1$ and $\{P^j_{i}\}_2$ in a laser sintering, powder bed fusion, or similar process, though this covering problem solution could be applied to any additive manufacturing scan or track based process, or additive manufacturing process generating surface patterns similar to those produced in a track or scan based process. The labels 1, 2, and 3 are intended to represent a chronological ordering for layer production, where such ordering is not intrinsic to the solution but rather has been imposed. The use of mirror-image smaller objects is meant to reflect the subtle difference in geometry that might result from printing a track in a position over a surface with asymmetric height variations (in this case, on the top, off-centered, of a previously printed scan track).
Figure 7C:
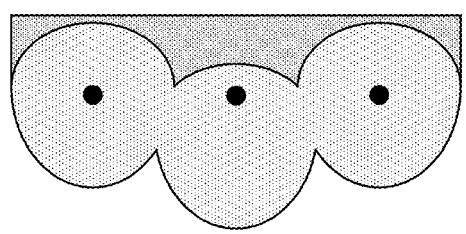
FIG. 7c is an illustration of a cross-sectional view layer of powder or other material deposited on top of an already-printed layer, layer 1 as described in FIG. 7b, with filled-dots in the already-printed layer representing the scan paths scanning in a direction perpendicular to the plane of the illustration.
Figure 7D:
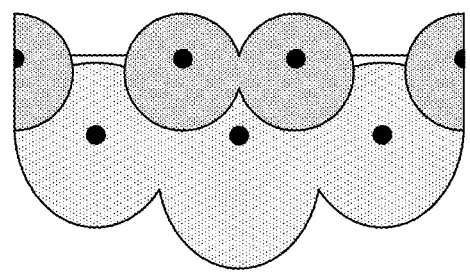
FIG. 7d is an illustration of a possible result of printing layer 2, as, described in FIG. 7b, with scan paths parallel or anti-parallel to those in layer 1. The illustration of remaining unconsolidated powder or other material indicates the possible presence of sintered material. Though the path-tangent track cross sections depicted are indicative of a parallel or anti-parallel scan direction relative to the paths of layer 1, layer 2 paths could be directed at a specified (or arbitrary) angle from that of the layer one paths, or along contours with changing angle relative to the layer 1 paths as the scan progresses.

This could be particularly relevant in a powder bed fusion or selective laser sintering process; if during the printing of a layer n the material is not fully melted, as seen for example in FIG. 7d where powder remains between the path-tangent cross sections depicted, that remaining material may nonetheless have been sintered or partially sintered, thereby changing the physical properties of the material and consequently possibly the track geometry of the tracks in layer n+1. This could also be the case if nearest-neighbor tracks were not printed in sequential order, but instead in even-odd parity ("every other track"), or other ordering. By way of example for general printing processes, the shape of the track can depend on the surface upon which the material is deposited, and in the example in FIG. 7, the surfaces of the smaller and larger tracks are different, thereby potentially altering the geometry of tracks printed on those surfaces and further altering the tracks in successive layers.

It is important to note that in processes where material is deposited in tracks such as material jetting, fused deposition modeling, multi-jet fusion, arc plasma sintering, some binder jetting processes and similar processes, the geometry of a track in a printed article may in some cases depend heavily on the surface on which the track is printed, where that surface often includes fully or nearly solidified, hardened or cured material from printing of tracks in prior layers. In the case of binder jetting or similar processes where a slurry, liquid, solvent, polymer, suspension, or other material in a flowable state, through capillary and deposition forces, infiltrates a layer of particulates to form a track consisting of both the material jetted and the particulates, the bottom shape of a track printed on top of previously solidified, hardened, or cured material from previously printed tracks may conform to the top of the previously printed tracks. Such a track shape differs substantially from a track printed with the same AM track geometry parameters, but on a deep (relative to track height) layer of particulate, or a thinner layer of particulate on top of a flat substrate. In a material jetting, multi-jet fusion, arc plasma sintering, fused deposition modeling, or similar process, the geometry of the surface on which the track is printed can also have an effect on track shape; in these cases, the extent of the effect is dependent on the viscosity of the material printed as compared to its curing, drying, or hardening time, in that a fast-hardening material with high viscosity will maintain a more independent geometry, whereas a slow-hardening material with low viscosity will tend to conform to the shape of the surface below it.

Regardless, the overlapping covering problem solutions described, for example in FIG. 7, with track geometry derived from printing on particulate layers (binder jetting) or relatively smooth surfaces (material jetting, multi-jet fusion, arc plasma sintering, fused deposition modeling), can be employed in these material deposition methods to advantageous effect. The reason is that the volume of a printed track will remain roughly constant, dependent almost entirely on AM track geometry parameters, regardless of the geometry of the surface on which the track is printed, even if track shape changes. Therefore, the ratio for tracks (track cross sections) of overlap volume (area) to total volume (area) in a covering problem solution unit cell, for these printing processes, can be taken as a measure of how much excess solution including binder and/or material it is necessary to deposit to fill the space of the cell without voids.

Capillary and deposition forces during track deposition will allow filling of some of the space between tracks printed previously, but as mentioned previously, the bottoms of printed tracks do not completely conform to the surfaces on which they are printed. Consequently, design of scan tracks using good covering problem solutions that employ overlap, but not too much (excess) overlap, between tracks will still tend to result in either a larger ratio of particles (for example, powder) to solution in green articles with very low porosity in binder jetting and similar processes, and a reduction in void space in material jetting, fused deposition modeling, arc plasma sintering, multi-jet fusion, and similar processes.

Elaborating, in binder jetting, enough solution including binding agent must be deposited to fill some, but not necessarily all, of the space between particles, where the quantity of solution deposited for a track of given geometry might be made directly proportional to the volume (surface area) of the track (track cross section) in a covering problem solution. However, excess solution, in addition to potentially causing problems during any binder removal step that is part of the sintering process, will lower the density of particulates in the green article and therefore either increase shrinkage during sintering or increase the porosity of the sintered part. Consequently, though scan strategies that employ overlap are necessary to ensure that the space between particles is sufficiently filled (for the reasons discussed previously), scan strategies designed from good covering problem solutions can reduce the minimal necessary overlap, thereby reducing part shrinkage during sintering and/or sintered part porosity. In material jetting, fused deposition modeling, multi-jet fusion, arc plasma sintering, and similar processes, overlap is again required, in this case to help ensure a reduction in voids in a printed article (both green and, where part of the process, sintered), but excess overlap can lead to over-deposition of material and/or other problems similar to those described for binder jetting.

Figure 8:
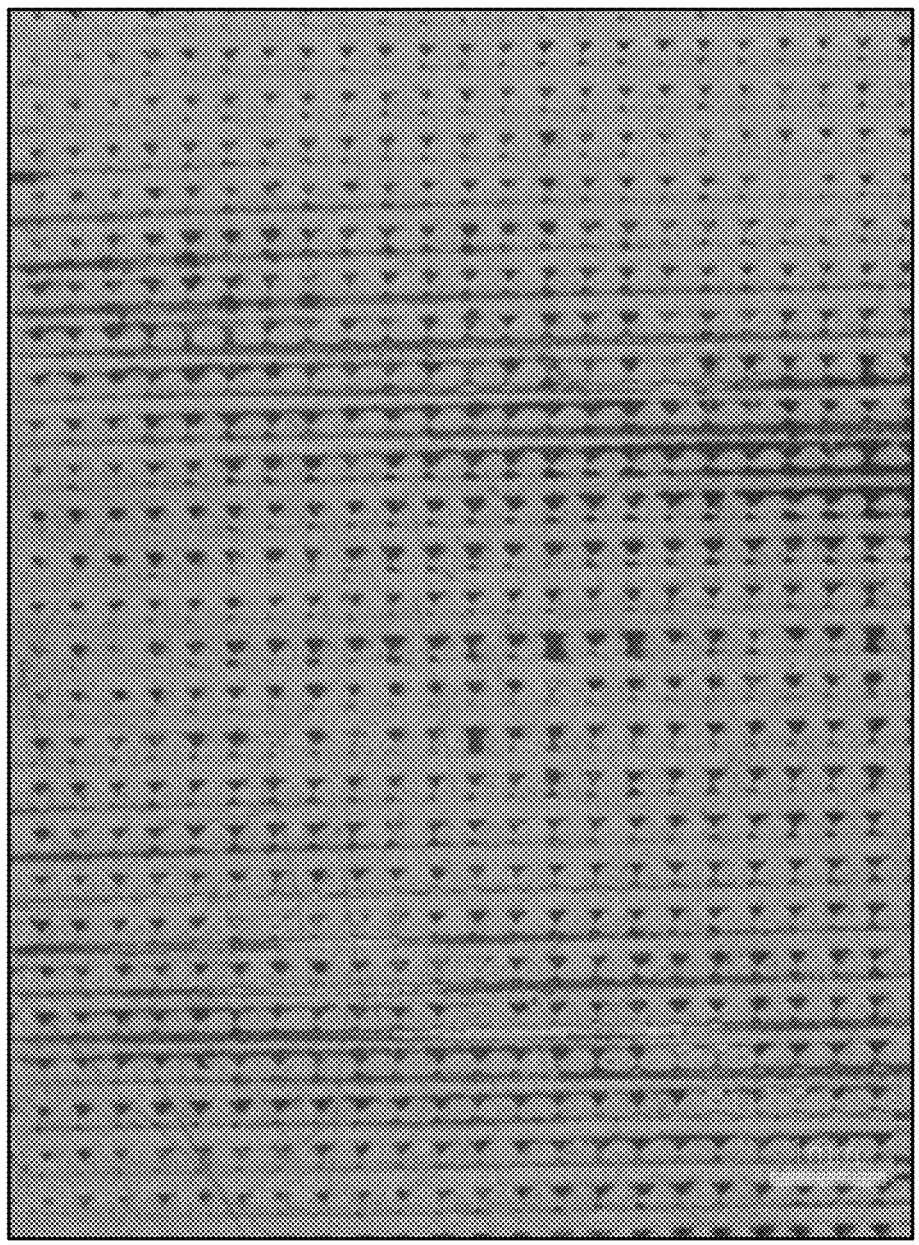
FIG. 8 is an image of a path-tangent track cross section of a part printed with a single track scan strategy consisting of repeating layers of a thermoplastic (polylactic acid) printed by material jetting, employing the basic scan paths as those described for Fig Gb. To generate each track, the same settings were used as described for FIG. 12, except nozzle scan speed was 1800 mm/m and extrusion ratio was 0.35. The settings used to fabricate this part are the default settings for the Prusa i3, where these settings are optimized to minimize porosity simultaneously with minimizing mechanical failures, surface roughness, and geometric deformities of the part. Measured porosity for this part was 8%.
Figure 9:
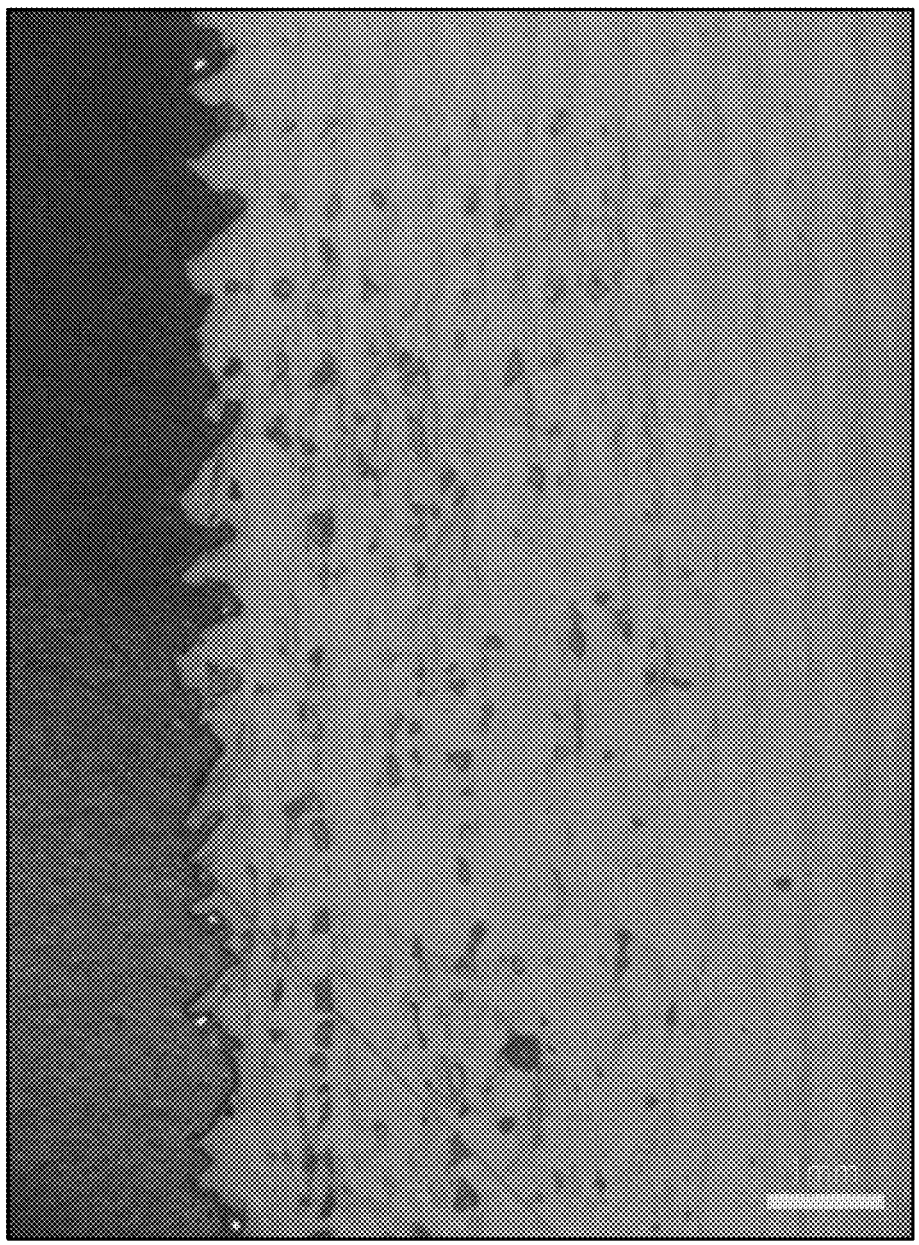
FIG. 9 is an image of a cross section of a part printed by material jetting of a thermoplastic polymer employing the same scan strategy as for FIG. 8, but with extrusion volume ratio setting of 0.52, equal to the average extrusion volume ratio setting employed for the part shown in FIG. 10. In this case, excess material was extruded, and the printer failed to build the part in entirety. This was the result of too much material being extruded (excess overlap), which also led to extremely poor surface finish and geometric accuracy, variable porosity across the part and higher porosity away from part edges. Measured part porosity away from the edges of the part averaged 7%. It is notable that despite the much larger average volume extrusion ratio of 0.52 employed for this part relative to 0.35 of the part shown in FIG. 8, only about 1% more material was extruded per unit volume of part printed due to the increased pressure at the nozzle with higher average extrusion volume ratio settings.

A good example of the types of problems that can emerge when excess overlap is employed in the generation or use of the scan strategy can be seen in FIGS. 8 and 9. FIG. 8 is a cross-sectional image of a cube printed using a material jetting process (fused deposition modeling) employing a thermoplastic polymer whereby tracks of a single geometry in layer n are laid down side by side with 400 um spacing, and in layer n+1, the same approach and track geometry are employed but tracks are rotated 90 degrees relative to layer n. FIG. 8 is an image of a part printed with machine nozzle speed, temperature, and material extrusion rate, among other parameters, optimized to print parts without creating mechanical problems in the printer, to generate a geometrically relatively more accurate part, and to minimize surface roughness, among other factors. For these settings, the resulting printed cube exhibits roughly 8% porosity. FIG. 9 is a cross-sectional image of the same digital cube (the image is rotated 90 degrees relative to FIG. 8) but printed with one setting change: an increase in the volume of material extruded, leading to larger, sometimes non-cylindrical, tracks. The print failed in the sense that the nozzle began scraping against the part due to an overabundance of material extruded, which can be viewed from a covering problem perspective as excess, or "too much" overlap. The edges and surface of the part were also far out of specification from a geometric perspective and from the perspective of surface roughness, as can be seen in FIG. 9, and the part exhibited porosities averaging 7% away from its edges.

Figure 10:
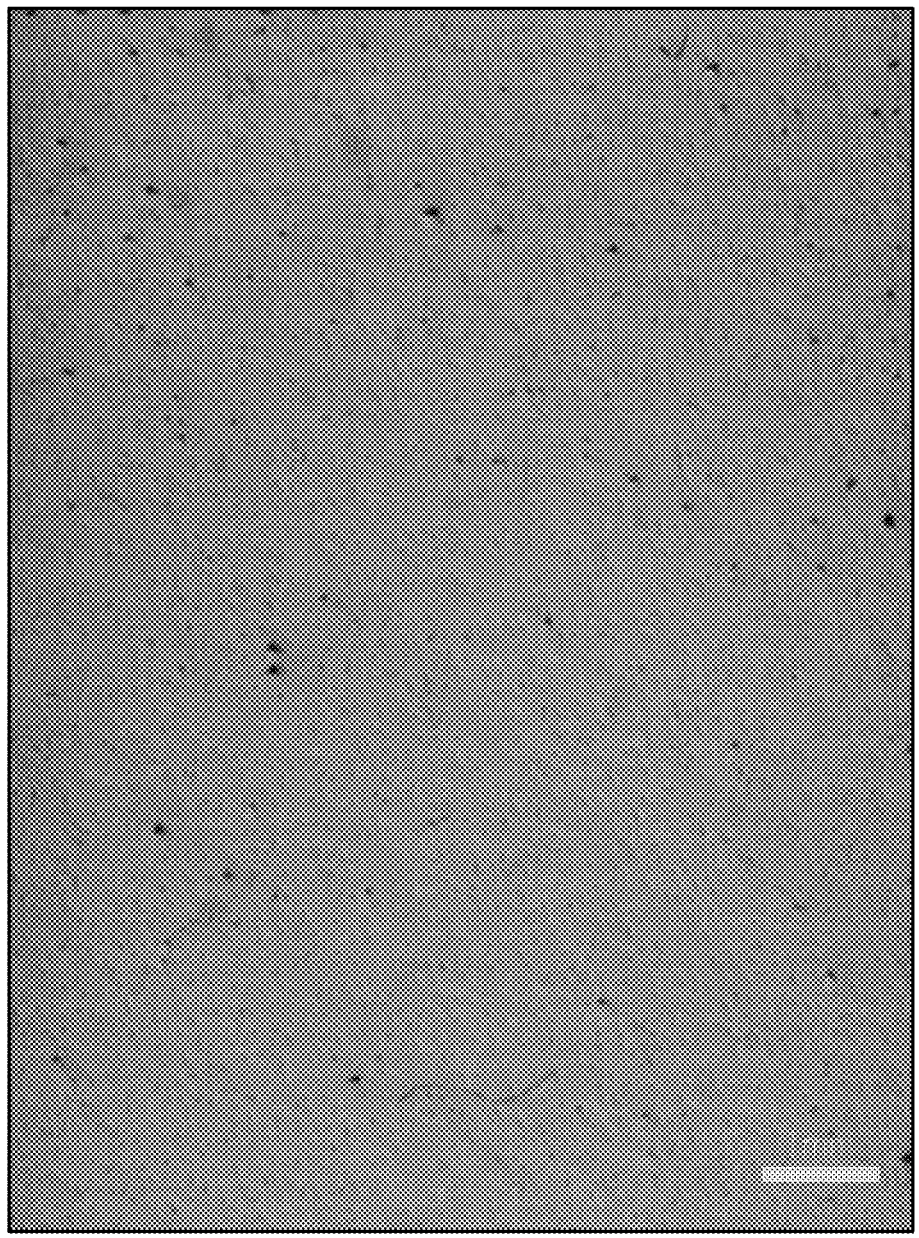
FIG. 10 is an image of a cross section of a part printed by material jetting of a thermoplastic polymer employing a two track geometry scan strategy based on the covering problem solution described in FIG. 16. The same settings were used to generate tracks as those described for FIG. 8, except with volume extrusion ratio of 0.69 for the large tracks and 0.34 for the small tracks. Measured porosity for this part was 0.2%. It is clear that a substantial porosity decrease is obtainable with this two track approach relative to the approach employed for the part shown in FIG. 8. It is notable that despite the much larger average volume extrusion ratio of 0.52 employed for this part relative to 0.35 of the part shown in FIG. 8, only about 8.4% more material was extruded due to the increased pressure at the nozzle with higher average extrusion volume ratio settings.
Figure 11:
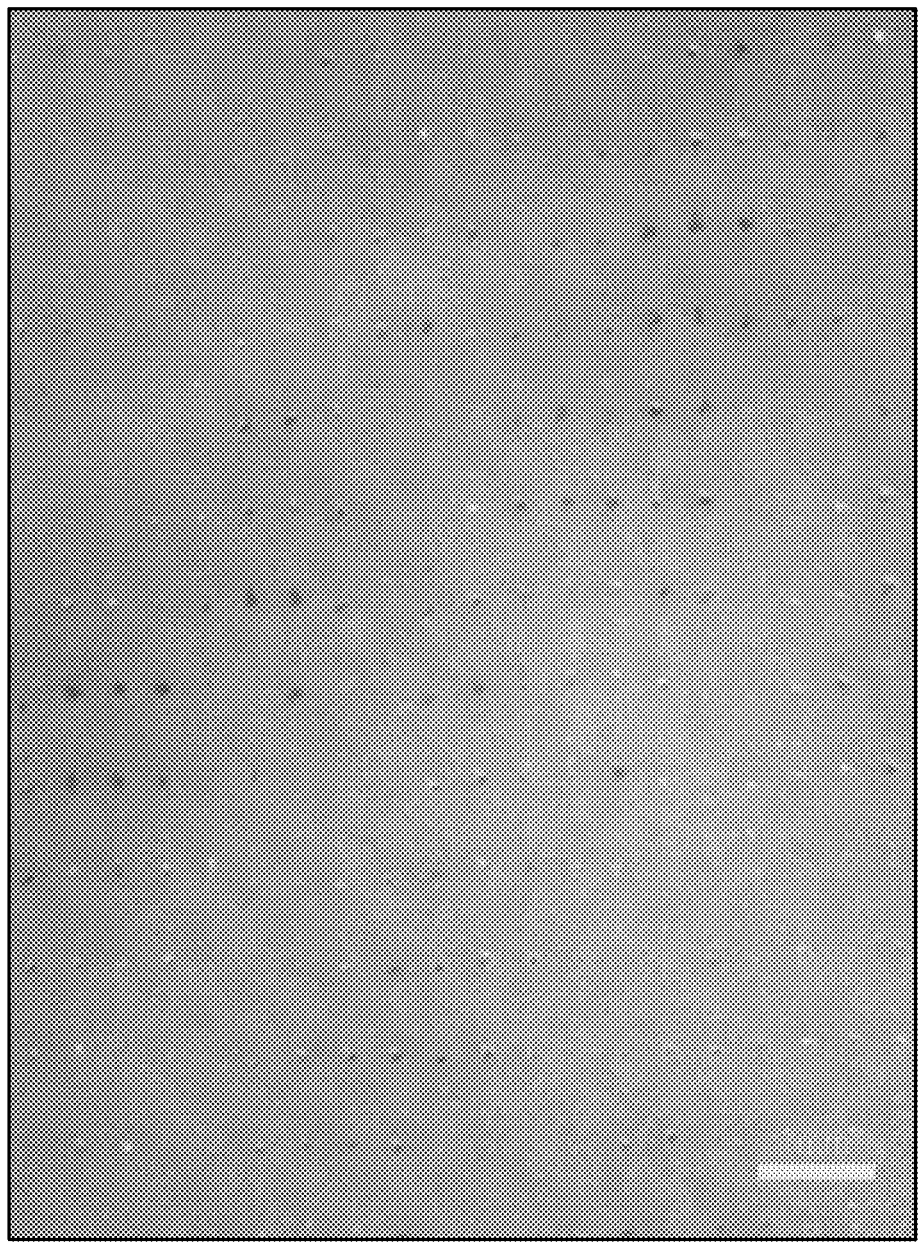
FIG. 11 is an image of a cross section of a part printed by material jetting of a thermoplastic polymer employing the same basic scan paths as those for the two track geometry scan strategy described for FIG. 26, and using the same settings to generate the small and large tracks as those described for FIG. 10. Measured porosity for this part was 2.3%. It is clear that a substantial porosity decrease is obtainable with this two track approach relative to the approach employed for the part shown in FIG. 8. It is notable that despite the much larger average volume extrusion ratio of 0.47 employed for this part relative to 0.35 of the part shown in FIG. 8, only about 6.4% more material was extruded due to the increased pressure at the nozzle with higher average extrusion volume ratio settings.
Figure 12:
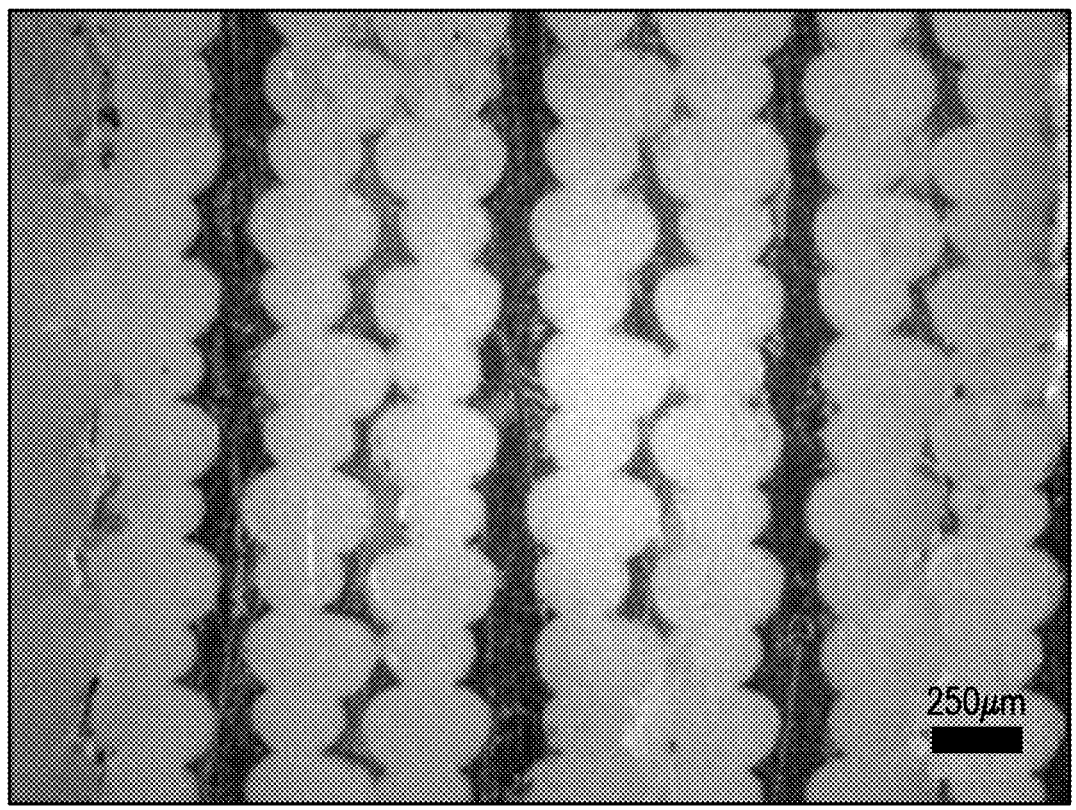
FIG. 12 is an image of a path-tangent track cross section of a part printed with a scan strategy consisting of repeating layers of a thermoplastic (polylactic acid) printed by material jetting, based on the covering problem solution detailed in FIG. 16. In this image, printer settings were chosen to demonstrate the difference in scan track geometry as opposed to for optimization of part porosity or other considerations. Within a single layer, track cross sections of alternating track widths are achieved through different scan strategies. The Prusa i3 fused deposition modeling material jetting printer in this case employs a nozzle diameter of 400 um, and print parameter settings include a hatch spacing and layer thickness of 200 um, nozzle scan speed of 900 mm/min, and 190 C extruder temperature, where small width tracks are printed with extruder volume ratio of 0.195 and large width tracks with extruder volume ratio of 0.39. During printing of this part, the smaller tracks while being printed tended to stick to the most recently printed adjacent larger tracks, thereby leading to the spatial separation in groups of two tracks, one smaller and one larger, observed in the image.

Such problems are alleviated when scan tracks of multiple geometries are employed, as is described in Examples 1 and 2. Using the same print parameters as in FIG. 9 except employing scan strategies utilizing two track geometries, substantially decreased porosity can be achieved without a failed print, loss of geometric tolerance, or increase in surface roughness. FIGS. 10 and 11, discussed in Examples 1 and 2, are cross-sectional images of the same digital cubes as shown in FIGS. 8 and 9, except printed with two different scan strategies each employing two track geometries. The tracks shown in FIG. 12 are representative of the track geometries deployed in FIGS. 10 and 11 (though in FIG. 12, the volume extrusion rate of material for each type of track has been scaled downwards proportionally so as to generate an image where track geometries are clearly discernable). The porosities measured for the cubes shown in FIGS. 10 and 11 are 0.2% and 2.3%, respectively, and the geometrical accuracy of the cube relative to the digital image, as well as the surface roughness, are improved as compared to the 8% porosity cube shown in FIG. 8, clearly demonstrating the advantages of the multiple track geometry methods employed.

The covering optimization problem thus far discussed may be extended, including by way of example such that object shape and size, which are AM track geometry parameter dependent, are variable rather than fixed, and/or such that the number and feedstock of objects in the basis set is variable. Such an extended problem would lend insight not only into advantageous or optimal scan paths, but also advantageous or optimal AM track geometry parameters, and the relationships between the two. An extended problem might also include additional constraints, for example, constraints limiting parameters $\{P^j\}$ according to capabilities of the printer and the physics of fusing particles or slurry, or constraints fixing the ratio of different materials in a multi-material problem. In such problems, it would be advantageous to have knowledge of track geometry for each feedstock at various values of AM track geometry parameters.

Figure 2:
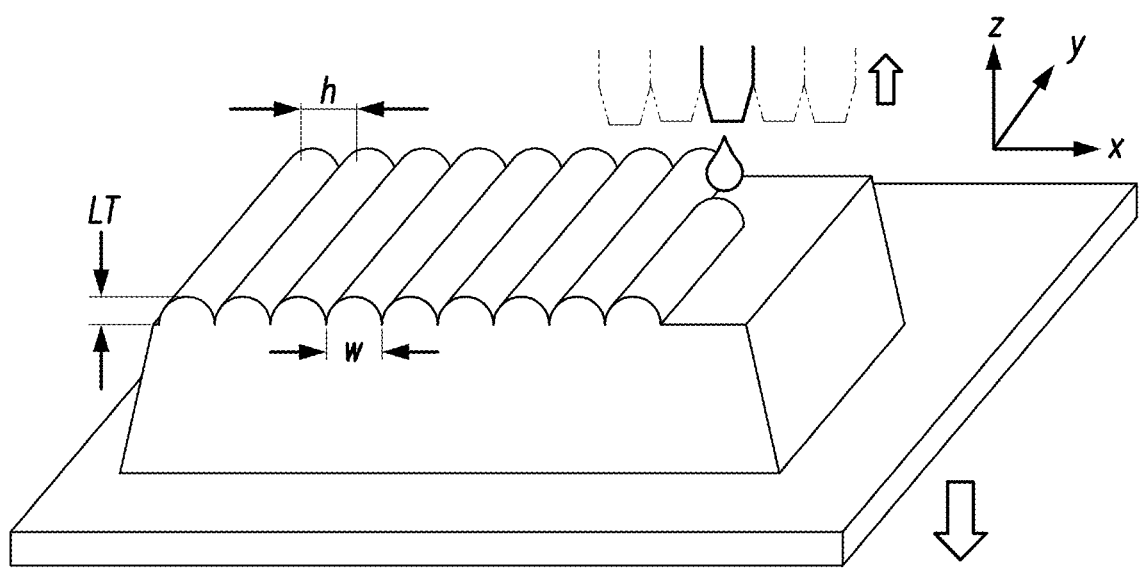
FIG. 2 is an illustration of planar layer build-up of an article through material jetting. One, or more, nozzle(s) deposits material(s) along coordinated adjacent paths spaced by a periodic distance called the hatch spacing h. The deposited material creates tracks of widths consistent with the hatch spacing and heights approximately equal to the layer thickness (LT) of the sliced article such that the rough shape of the area of the tracks is representative of the slice of the article. Material for successive slices of the same three-dimensional article can be deposited through a combination of these scan paths along with a distance offset oriented in the build-up direction approximately equal to the layer thickness at that point, achieved through the motion of a precision stage or of the dispensing nozzles.
Figure 3A:
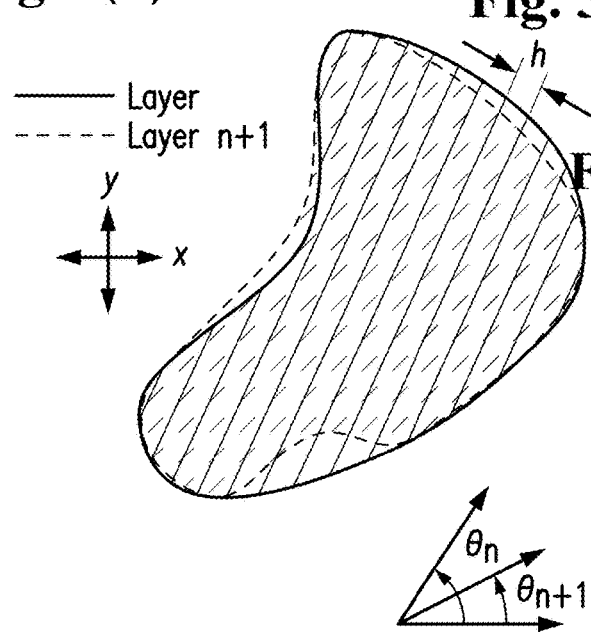
FIG. 3a is a schematic drawing illustrating an energy deposition scan strategy commonly employed in powder bed fusion and laser sintering processes. In this example, the scan strategy is composed of a single contour path, representative of the lateral cross section of the slice of the article, and a multitude of parallel, adjacent paths separated by hatch spacing h, to achieve a contiguous area (or fill) of the slice of the article upon powder consolidation. An energy source scans the prescribed paths to melt or sinter powder particles that subsequently resolidify to form a solid layer. Scan strategies need not be identical nor similar between layers—incremental rotation or translation of scan paths are employed. By way of example, between layer n and layer n+1 representing successive slices of the article, the fill paths are rotated in a controlled fashion by a certain angle increment, from angle $\theta_n$ to $\theta_{n+1}$.
Figure 3B:
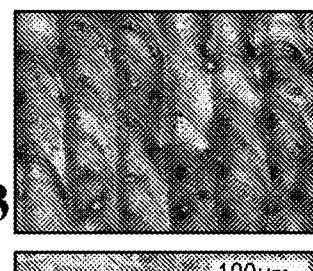
FIG. 3b is an optical micrograph of the top of a single layer of steel scan tracks produced by powder bed fusion, employing a scan strategy similar to that described in FIG. 3a. Reproduced from I. Yadroitsev P. Krakhmalev, and I. Yadroitsava, *Hierarchical design principles of selective laser meting for high quality metallic objects*, Additive Manufacturing 7, pp. 45-56, 2015.
Figure 3C:
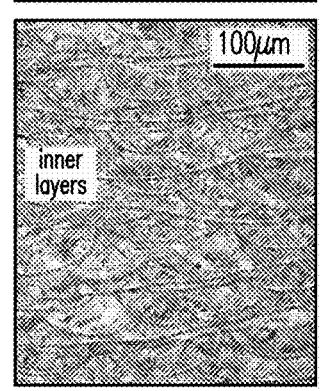
FIG. 3c is an optical micrograph of an etched vertical cross section of a multilayer article produced by powder bed fusion, employing a scan strategy similar to that described in FIG. 3a. The cross sections of the resolidified powder along the scan tracks show the complex layered structure and isotropy imparted through controlled rotation of scan paths between layers. Reproduced from I. Yadroitsev P. Krakhmalev, and I. Yadroitsava, *Hierarchical design principles of selective laser meting for high quality metallic objects*, Additive Manufacturing 7, pp. 45-56, 2015.

Given any solution to the problem, a scan strategy can be extracted from that solution based on the geometry of the objects (tracks or track cross sections) and their positions. To extract the scan strategy, the printer is required to print, in fabricating a track, with the parameter set $\{P^j_{i}\}_k$ that corresponds to the object $O_{j,k}$ in the solution with that parameter set. The scan path is defined by where the print head must be positioned and/or deposition of energy and/or material must occur to fabricate an approximation of the object $O_{j,k}$ (or its extrusion, in the case of a track cross section) at its position in the solution. Most simply for energy deposition, this might be defined as the center point of the object, though for both energy and material deposition, the specific position, particularly, in the build-up direction can vary, as is discussed further below. By way of example, a print head that deposits material might need to be positioned on the order of a few track heights above the surface of the article being fabricated in order to fabricate a track, as is shown by way of example in FIG. 2.

Figure 13:
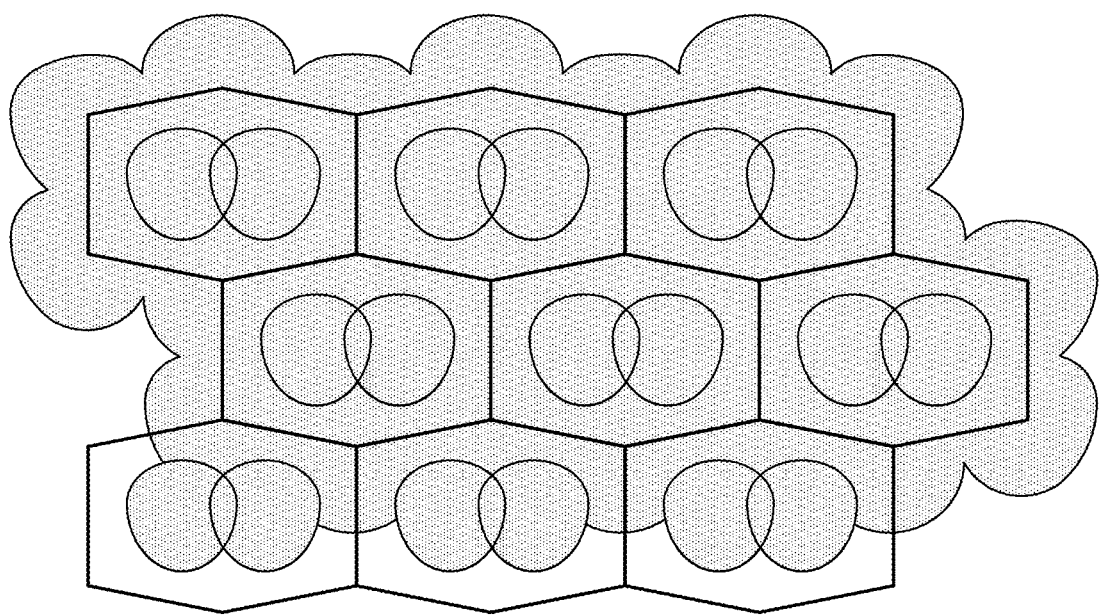
FIG. 13 is an illustration of replicating unit cells both within and across layers in order to cover an arbitrary geometric space with a covering problem solution. As is depicted in the figure, tracks can be omitted from individual unit cells in order to better conform to the overall space intended to be covered.
Figures 14A, 14B:
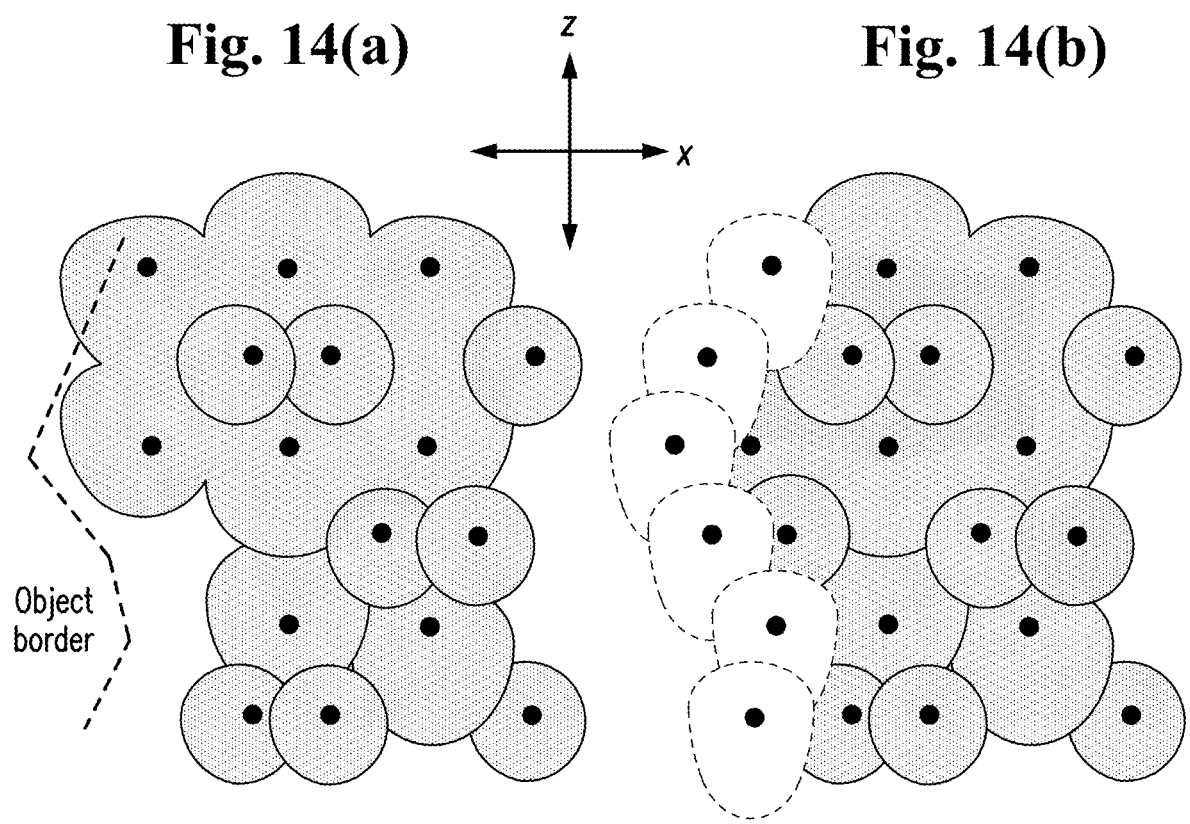
FIG. 14a is an illustration of how scan tracks conforming to a covering problem derived scan strategy employing multiple objects of different AM track geometry parameters might be adapted to conform to an object boundary by removing scan tracks within individual unit cells. The image depicted is intended to represent a cross section with normal vector that is path-tangent to the scan paths of the covering problem derived strategy at the point of cross section; however, such a cross section might not also be path tangent to the border of the article, or to any contours near that border, at any layer. In general, the tracks derived from the solution to the covering problem are not required to be straight or parallel to one another or the contours across different layers.
FIG. 14b is an illustration of the addition of contour tracks (represented by track cross sections) across several layers at the border of an article that is designed with a covering problem derived scan strategy. In this image, the contour track cross sections at the border are only one layer thick, though they could be multiple layers, or they could consist of an additional covering-problem derived scan strategy employing multiple AM track geometry parameters. Additionally, the contour track cross sections are depicted as path-tangent cross sections for the sake of simplicity, though the contours might travel is different directions or angles at any cross section of the article relative to the tracks of the covering problem derived scan strategy. It is of note that relative to FIG. 14*a*, one track of the covering problem derived scan strategy near the object border has been removed, in order to illustrate a simple process of conforming contours to a covering problem derived scan strategy.

A solution can be extended over an arbitrary amount of space by replicating the unit cell to cover the space desired. This concept is demonstrated for the covering solution presented in FIG. 7 and FIG. 13. With respect to fabricated article outer surfaces, arbitrary contour scans can be defined to border a space covered by an extended solution, meaning that solutions are not article-geometry or slice-geometry dependent insofar as the article or slice lateral extent in a given layer is at least as large as one of the objects inside the unit cell. This concept is demonstrated in FIG. 14.

Figure 15:
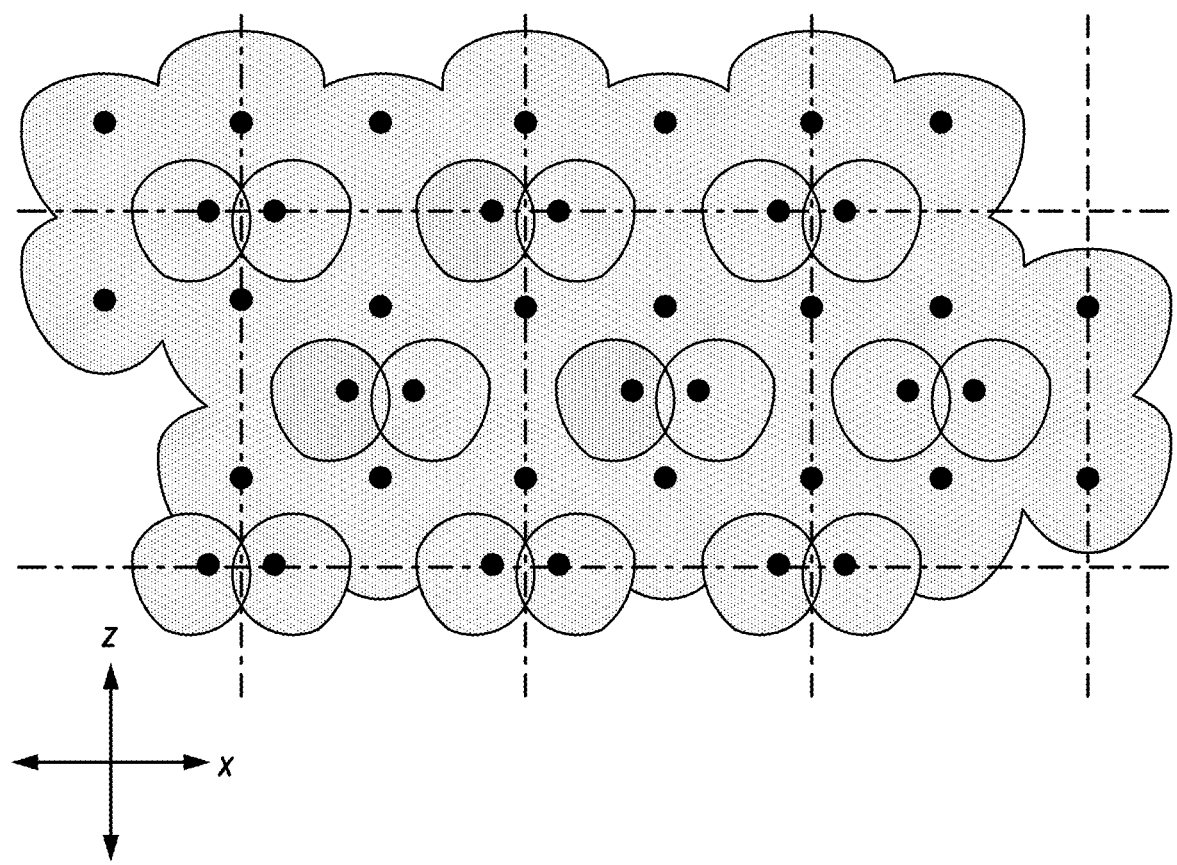
FIG. 15 is an illustration describing a choice for the relative position of scan contours and layering for the same covering problem derived scan strategy presented in FIG. 7. In this figure, the unit cell described in FIG. 7*b* has been redefined to include more objects in order to simplify the approach to layering in a system where a layer is of constant net displacement. The new unit cell basis vectors ($b_1$, $b_2$) can be written as (3.18, 0.0) and (0.0, 4.0) in units of slice thickness, which is constant in this case, for a Euclidean coordinate system with the x-axis to the right and the z-axis up. In the same units and coordinates, the width (x-axis) of the larger tracks is 1.84, and its total height (z-axis) is 1.79. The width of the smaller tracks is 1.28 and their height is 1.31. For this scan strategy, each slice is additionally of the same constant net displacement (though material thickness for each slice is not herein specified). The x-axis spacing between larger scan tracks is 1.59, and the x-axis spacings between smaller scan tracks are 1.08 and 2.05. It is clear from this image that different unit cells can be defined for the same covering strategy solution; however, for this particular solution, no unit cell with a basis smaller than 4 (2 large tracks cross sections, one each of the mirror-image small track cross sections) can be defined.

There is flexibility in defining layers from a solution, in that not all objects in a unit cell might be fabricated in a single layer. More specifically, it is not required to define layers, possibly with net displacement differing from layers above or below, by assigning a new layer for all objects with configurations $r_{j,k}$ with object spatial positions falling at the same displacement in the build-up direction. An example of layer definition for the covering solution presented in FIGS. 7 and 13 that permits a scan strategy of constant slice thickness (and AM track geometry parameters exhibiting constant net displacement), is presented in FIG. 15. In this example, the unit cell has been redefined in order to simplify the implementation of a scan strategy; regardless, the covering solution has not been changed.

Figure 17A:
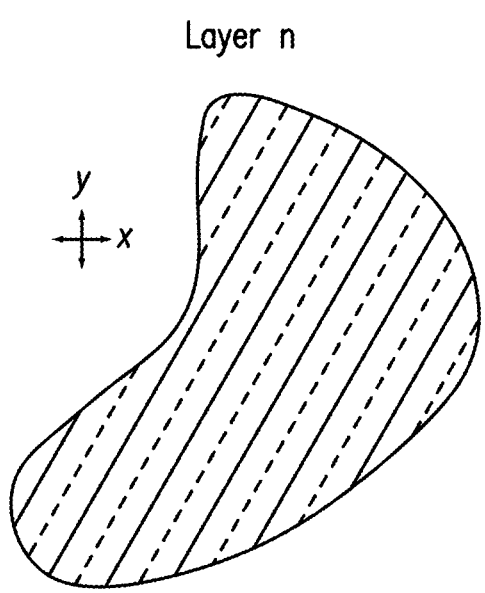
FIG. 17*a* is a top-down illustration of a scan strategy employing the covering problem solution unit cell as described in FIG. 16. Layer n consists of linear scan paths which alternately employ different AM track geometry parameters. Adjacent scan tracks need not necessarily be printed in chronological order.
Figure 17B:
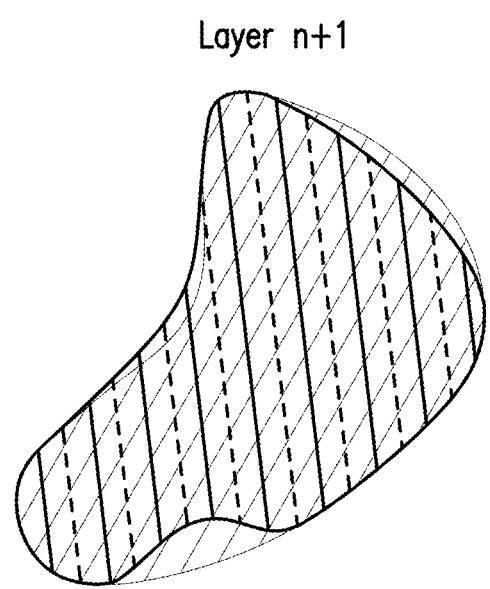
FIG. 17*b* is a top-down illustration of a scan strategy employing the covering problem solution unit cell as described in FIG. 16, in which a rotation between successive layers has occurred. Layer n+1 consists of scan paths and AM track geometry parameters similar to its prior layer n, as described in FIG. 17*a*, that have undergone an in-plane rotation about the z axis relative to layer n.
Figure 18A:
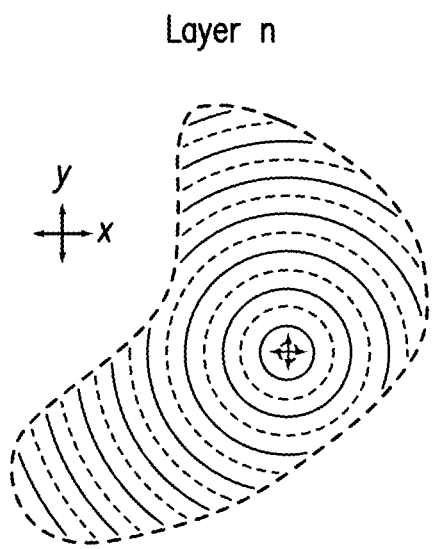
FIG. 18*a* is a top-down illustration of a layer n of a circular scan strategy implementation of the covering problem solution unit cell as described in FIG. 16. Scan paths of alternating AM track geometry parameter sets are circularly symmetric about the indicated point.
Figure 18B:
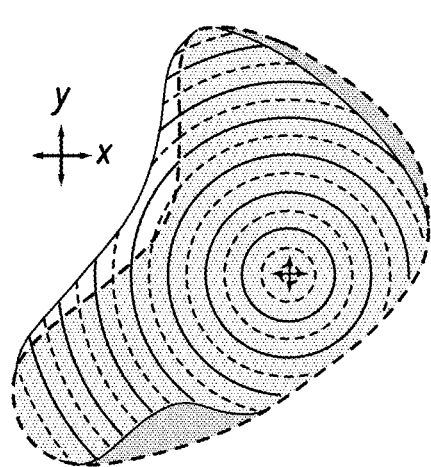
FIG. 18*b* is a top-down illustration of a successive layer n+1, relative to layer n described in FIG. 18*a*, of a circular scan strategy implementation of the covering problem solution unit cell as described in FIG. 16.. Successive layer n+1 consists of the superimposed scan paths of the prior layer n but of the alternate AM track geometry parameter. Scan paths are circularly symmetric about the indicated point, forming the longitudinal axis of a cylindrical coordinate system with the symmetry point in the previous layer n.
Figure 18C:
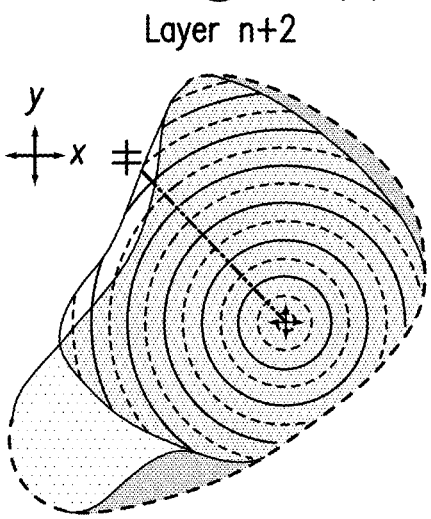
FIG. 18*c* is a top-down illustration of a successive layer n+2, relative to layer n+1 and layer n described in FIG. 18*b*.
Figure 18D:
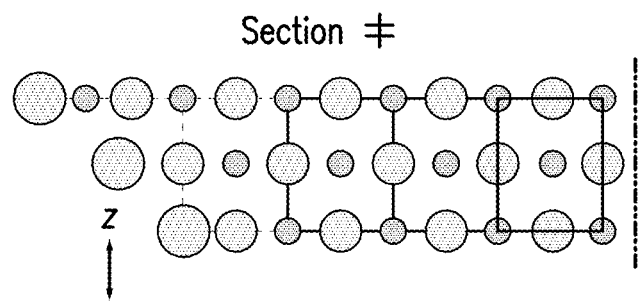
FIG. 18*d* is a path-tangent cross-sectional illustration of the three successive layers (layer n, n+1, n+2 as described in FIG. 18*a-c*) along the section line indicated in FIG. 18*c*, showing the application of the covering problem solution shown in FIG. 16, through the rotation of the unit cell about the longitudinal axis of a cylindrical coordinate system. It is of note, however, that the scan paths need not be circularly symmetric about a longitudinal axis but the symmetry point could be translated between layers and might be advisable due to the small variations in height at the surface of the scan tracks printed in each layer. Furthermore, the scan paths could be drawn along an arbitrary contour provided the paths are nearly parallel.

Additionally, scan tracks within successive layers need not follow the directional orientation suggested by track cross sectional objects in a covering problem solution. For example, in FIG. 16, a depiction of a path-tangent cross section of a covering problem solution derived scan strategy with a unit cell including two different objects generated from different AM track geometry parameters employing a powder bed fusion or laser sintering process, three layers of tracks are shown where these tracks are all parallel at the cross sectioning plane. In this case however, due to small variations in height at the surface of the scan tracks printed in each layer or other reasons, rotation every layer, every two layers, or every n layers, might be advisable. FIG. 17 depicts top-down illustration of two successive layers in which a rotation has occurred in layer n+1 relative to layer n. For the covering problem solution demonstrated in FIG. 16, it is additionally not necessary to print adjacent scan tracks in chronological order; for many processes, it is advantageous to print the smaller tracks in a layer first, followed by the larger tracks. It is further not necessary for the tracks to be straight, as depicted in FIG. 17; arbitrary contours or paths can be employed. By way of example, FIGS. 18a-c illustrate a strategy where three layers of scans are printed with circular symmetry about a central point, and FIG. 18d, a path-tangent cross sectional image of the three layers along the dot-dash line shown in FIG. 18c, shows that indeed the same covering problem solution is employed to derive the FIGS. 18a-c strategy as that shown in FIG. 29.

It is sometimes necessary to select an angular orientation for the unit cell in order to define layers; however, the angular orientation of the objects may be fixed according to the relative location of a print head and/or the directionality of energy and/or material deposition, thus fixing the angular orientation of the unit cell. The angular orientation of the cell might also be fixed in the case of a covering problem solved according to a non-Euclidean geometry, or in other cases as well. Regardless, even in cases where constraints on orientation are imposed during the solving of the problem, there may be an option to choose in which layer certain objects will be printed, and this choice might differ for the same basis object appearing in different cells. Importantly, objects $O_{j,k}$ of different geometry might appear within the same layers, or certain layers might be made up only of objects of one geometry type. In the example presented in FIG. 13, the angular orientation of the objects is fixed according to the position of the laser, the unit cell most simply includes objects from three different layers due the vertical stacking of three different basis objects in the center of the cell (though five layers are defined in FIG. 15 in order to more simply define a scan strategy), and alternating layers contain objects of only one, or objects of two different types, of track cross section, where the smaller objects are those exhibiting two types of track cross section, which are mirror images, due in this example to the differing surface geometry on which they are printed.

Figure 19:
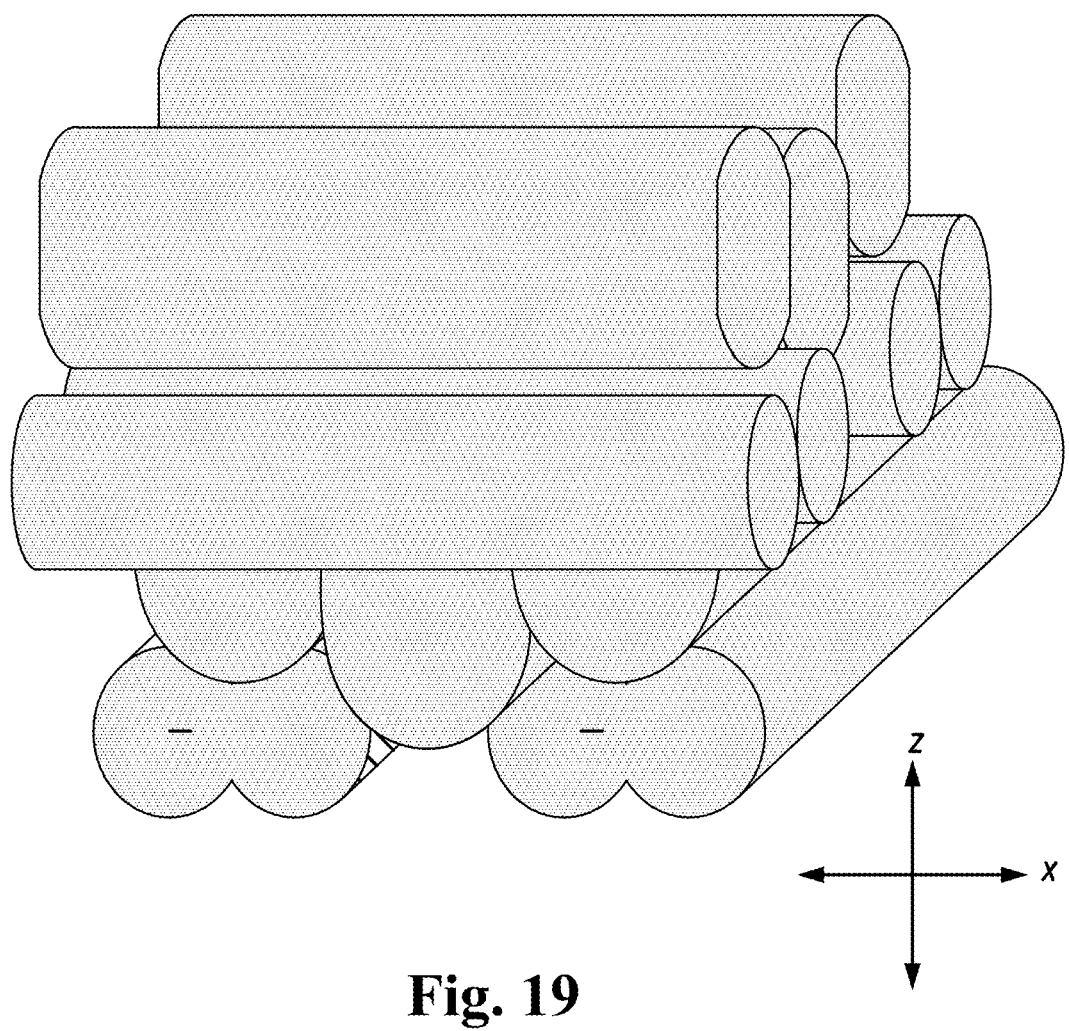
FIG. 19 is an illustration of scan tracks in a scan strategy with a rotation of about 90 degrees every two layers derived from the covering problem solution depicted in FIG. 7*b*. The rotation angle shown is about 90 degrees, but it could be chosen to suit desired printed article properties, or to improve throughput at a given porosity, or for other reasons. Additionally, rotation need not occur every two layers, but could occur every layer, or every n layers. Further, the tracks need not be straight within each layer as shown for simplicity of representation in this figure, but could consist of parallel paths of any direction along the surface of the layer.

Scan strategies containing objects printed with more than one set of AM track geometry parameters can also contain rotations in track direction between layers, or every two, three . . . or n layers. By way of example, FIG. 19 depicts a rough illustration of scan tracks in a scan strategy with a rotation of about 90 degrees every two layers derived from the covering problem solution depicted in FIG. 7b. The rotation angle can be chosen to suit desired printed article properties, or to improve throughput at a given porosity, or for other reasons. Further, tracks need not be straight as shown in FIG. 19, but could consist of parallel paths of any direction within the surface of the layer, including by way of example the circular pattern shown in FIG. 18.

A global solution to a covering problem is not necessary to produce advantageous scan strategies; coverings that are locally optimal, or that have been derived from locally optimal solutions, might even be more advantageous depending on fabricated article targeted mechanical properties or other requirements. For example, covering problem solutions that are locally optimal often include regions or points of space near the borders of objects that are covered by only one object. Due to the fact that scan and track based printing methods tend to produce tracks that vary stochastically in their local geometry, regions or points of space near or on the borders of objects that are only covered once may be more likely to become regions or points where a lack of fusing of powder or slurry can occur during printing. Consequently, if fewer such lack-of-fusion regions, or similarly, a lower porosity fabricated article is desired, increasing the overlap in these regions may be desirable.

Figure 20A:
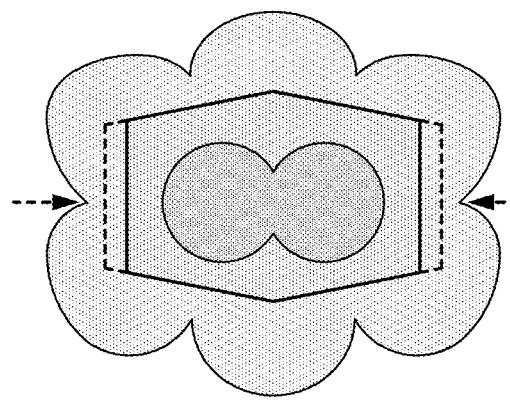
FIG. 20*a* is an illustration depicting scaling performed on the unit cell from the covering problem solution shown in FIG. 7, whereby this scaling (and other operations) permit degrees of control over the scan paths and therefore the speed of print (printer throughput) and physical properties and qualities of the printed article, measured, by way of example, in terms of article porosity. The unit cell is scaled down in the hatch spacing direction, accomplished by reducing the hatch spacing while holding AM track geometry parameters fixed. This is a conformal (angle preserving) scaling in the unit cell by a factor of 0.87 in the x-direction (right), meaning that the angle between the centers of the objects changes, as well as the ratios between slice thickness to hatch spacing, and slice thickness to track width, assuming constant slice thickness similar to those presented in FIG. 15. Other scaling and distortion operations are of course also possible. In general, increasing the degree of overlap of tracks as compared to the tracks depicted in FIG. 7*b* in a binder jetting, powder bed fusion, laser sintering, or similar process will decrease the porosity of the printed article and the speed of print, up to a point, and then porosity may begin to increase once again. In a material jetting, fused deposition modeling, or similar process, a slight decrease in track overlap as compared to that in the tracks depicted in FIG. 7b might be required to reduce porosity, but as overlap was decreased further and eventually eliminated entirely, porosity would increase.
Figure 20B:
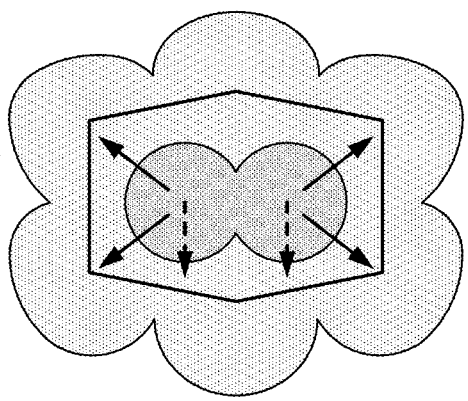
FIG. 20b is an illustration for the unit cell depicted in FIG. 20a depicting a change in AM track geometry parameters designed to increase overlap, as might be useful in decreasing the porosity of an article printed by a binder jetting, powder bed fusion, laser sintering, or similar process. In this example, print speed (an AM track geometry parameter) is reduced for the smaller objects, resulting in 17.5% deeper and wider such objects for a total area increase of 38%, and these smaller objects are additionally relocated somewhat lower in the cell to more accurately reflect track fabrication given a slower speed of print. Other such AM track geometry parameter changes (and position changes) can be applied in general in a similar fashion to increase or decrease porosity, print throughput, and other printed article and printing characteristics. The unit cell depicted in this figure, contains slices and scan paths defined perpendicular to the plane of the layers as in FIG. 7d and rotation every two layers as in FIG. 19.

This can easily be accomplished by a simple scaling of the unit cell, or by a combination of a scaling and minor readjustment of object locations, or by altering the track geometry parameters $\{P^j_i\}_k$ of certain objects in a fashion known to increase object area or volume, or by a combination of all of these methods or other methods as well. FIG. 20 demonstrates such an approach for the example shown in FIG. 7. In FIG. 20a, the unit cell is scaled down in the hatch spacing direction, accomplished by reducing the hatch spacing while holding AM track geometry parameters fixed. In FIG. 20b, print speed (an AM track geometry parameter) is reduced for the smaller objects, resulting in deeper and wider such objects, and these smaller objects are additionally relocated somewhat lower in the cell to more accurately reflect track fabrication given AM track geometry parameters and object relative positions.

Figure 21:
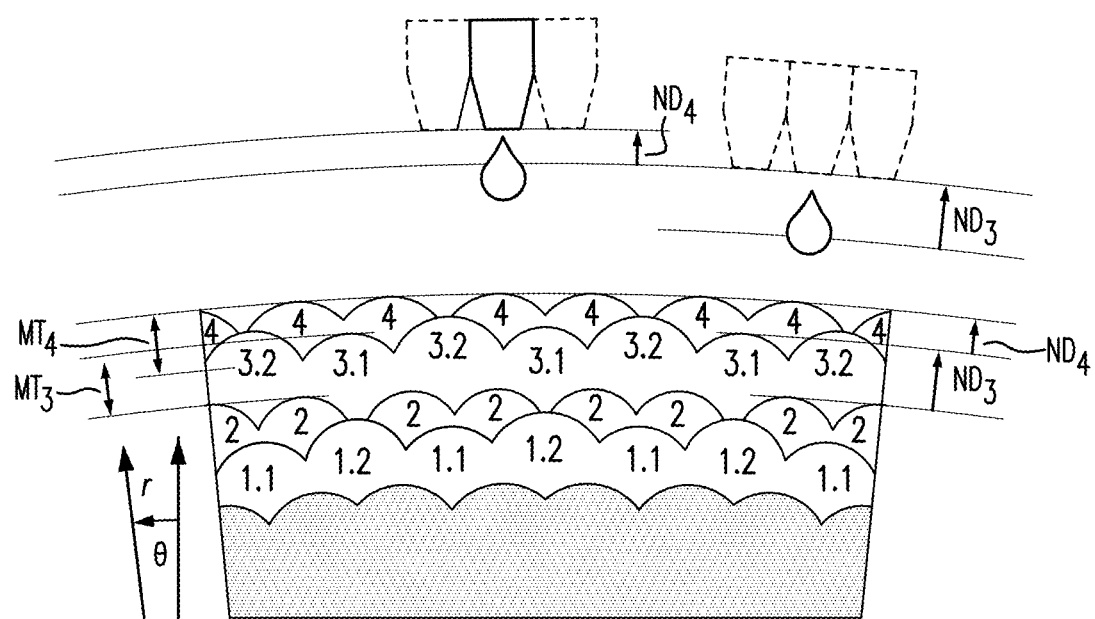
FIG. 21 is an illustration of a cross section of an article with the normal of the sectioning plane in a path-tangent direction, where the article is printed according to a covering problem solution derived using unit cells on curved and scaled space with spherical geometry, employing a material jetting, fused deposition modeling, arc plasma sintering, multi-jet fusion, binder jetting or similar process. In particular, the unit cell and the positions of the objects depicted in FIG. 7b are scaled by the transformation: z->r, x->θ, for radial coordinate r representing a distance r from a center point and angle θ a rotation from zero degrees at radius r, and where the width w of the cell in x-z space is taken to be equal to the width of the cell at layer one in the image, meaning $w^2=2*(r_1)^2*\cos(\theta))$ at layer one. In this transformation, each unit cell increases in area (or volume) as the radial distance from the center point is increased, and the center position of each track is also according scaled; however, the track cross sections are not scaled, suggesting no change to AM track geometry parameters. To account for distortions due to scaling, tracks size might be scaled as well according to the radial distance by altering AM track geometry parameters; or, every few layers, unit cells could be downsized such that at layer n, $w^2=2*(r_n)^2*(1-\cos(\theta))$. The labels "1.1" are meant to indicate that these tracks are printed first, with tracks "1.2" printed subsequently to achieve higher maximal radial build-up based on the surface structure of the tracks printed in the prior layer. Track height follows the arc of the sphere's surface in the build-up direction, perpendicular to the surface of a sphere of radius r, but scan paths might travel according to curved or straight contours, by way of example, around an axis through the center point to its highest point in the figure, or in a straight line into the page. Material thickness (MT) and net displacement (ND) need not be equal nor consistent between layers. In this example, $MT_3>ND_3>MT_4>ND_4$.

Cells can be scaled as well as objects, in particular if the geometry of the space on which the lattice is defined is curved or scaled. FIG. 21 is an example cross section image of tracks printed according to a covering problem solution derived using unit cells on curved and scaled space with spherical geometry, employing a material jetting, fused deposition modeling, arc plasma sintering, multi-jet fusion, binder jetting or similar process. In the case presented in the figure, each unit cell is curved according to a radial distance r from a center point, and unit cells farther from the sphere center are larger in area (or volume) from those closer to the center point. This implies a similar spherical geometry to slices and layers. Tracks in this case can be scaled in size (or potentially shape) according to radial distance as are cells (this would require changes in AM track geometry parameters), or they could be held constant in size and shape. Additionally, tracks might travel according to curved or straight contours, by way of example, around an axis through the center point to its highest point, or in a straight line into the page, but following the arc of the sphere's surface in the build-up direction.

A scan strategy that incorporates tracks of different targeted average geometry, such as is created by altering printer, AM track geometry, feedstock, and other parameters, produces fabricated articles that are of a fundamentally different composition than those produced using a single targeted average geometry. From a materials perspective, scan tracks are varied objects that tend to exhibit different crystallographic (or disordered, linked) structures and chemical composition based on proximity to the surface of the track, due to differing cooling rates, molecular diffusion rates, bonding properties of polymers, gas absorption rates, etc.. Further, because their surfaces are exposed to the atmosphere (or near-vacuum) of a printer, surfaces of a track tend to form more oxides, nitrides, carbon compounds, and impurities as compared to the centers of tracks, even in relatively inert atmospheres, for example such as 99.99% $N_2$, Ar, or other inert gases, and in near-vacuum. As a result of both of these and other differences, tracks of differing track cross sections cause differences in fabricated article mechanical, thermal, electrical, and other physical properties.

Figure 22:
FIG. 22 is an image of a path-tangent track cross section of a single layer of a stainless steel part printed by laser powder bed fusion with a laser power of 250 W, hatch spacing of 140 um, gaussian beam waist of 55 um and laser scanning speed of 1046 mm/s. This single layer is representative of a single layer in a single track geometry scan strategy; typical in such strategies, scan path directions in successive layers will be rotated relative to previous layers, though this is not shown here.
Figure 23:
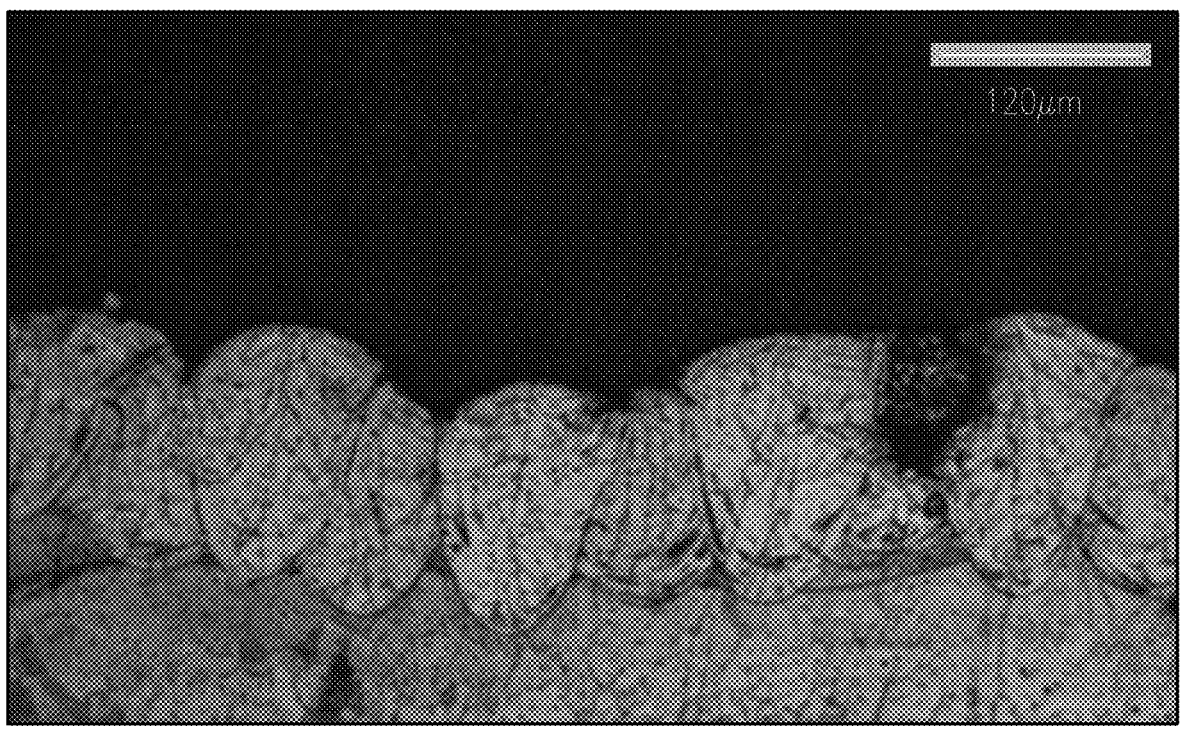
FIG. 23 is an image of a path-tangent track cross section of two layers of a stainless steel part printed by laser powder bed fusion with a laser power of 250 W, hatch spacing of 140 um, gaussian beam waist of 55 um, and laser scanning speed of 1210 mm/s. This is an implementation of the specific "interleaved" scan strategy described in U.S. Pat. Nos. 6,596,224 and 6,677,554 and diagrammed in FIG. 4. Note how the path-tangent cross section of each scan track is similar between the top layer (second layer) and the layer below (first layer). It is of note that the area of the track cross sections of the first layer that are covered by the track cross sections of the second layer are no longer visible; this is a common feature of cross-sectional images where track overlap occurs.
Figure 24:
FIG. 24 is an image of a path-tangent track cross section of a single layer of a stainless steel part printed by laser powder bed fusion based on the covering problem solution detailed in FIG. 16. In this case, track cross sections of two different areas/geometries are achieved utilizing different scan strategies. Small width tracks are printed with a laser power of 250 W, gaussian beam waist of 55 um, and laser scanning speed of 2038 mm/s, while large width tracks are printed with a laser power of 250 W, gaussian beam waist of 55 um, and laser scanning speed of 860 mm/s, where the distance between the centers of small and large tracks is fixed at 140 um.
Figure 25:
FIG. 25 is an image of the path-tangent track cross section of two layers of a stainless steel part printed by laser powder bed fusion based on a covering problem solution utilizing two track geometries. In this example, an initial layer of large width scan tracks separated by 140 um hatch spacing are printed from 50 um powder thickness with a laser power of 250 W, and gaussian beam waist of 55 um. A second layer with net displacement and powder thickness of 50 um is employed to produce small width scan tracks whose track cross section center points are displaced approximately 70 um relative to the large width scan track cross section center points of the first layer; the same parameters are used except with scan faster by a factor of 1.6.

The differences in micro- and macro-structure generated by different scan strategies and track geometries are demonstrated visually for a variety of materials printed via several processes in FIGS. 12 and 22-27. FIG. 22 is a path tangent cross-sectional image, etched using acid to reveal grain and track boundary structures, of a single layer of steel printed in a laser powder bed fusion process employing a laser power of 250 W, hatch spacing of 140 um, a laser scan speed of 1046 mm/s, and a roughly gaussian beam intensity profile shaped by an F-Theta lens with beam waist of about 55 um. This can be compared to FIGS. 23-25, which are printed using the same powder and process but different scan strategies; FIG. 23 is an image of two layers of the "interleaved" strategy discussed in U.S. Pat. Nos. 6,596,224 and 6,677,554; FIG. 24 is an image of a single layer of a strategy based on the covering problem solution described in FIG. 16; and FIG. 25 is an image of two layers of a strategy that alternates layers of larger and smaller tracks where the tracks in each successive layer are printed roughly in between those of the previous layer.

Track orientation and track size have a significant effect on macroscopic fabricated article properties. For example, comparing an article fabricated from tracks with scan paths always in the X or negative X direction to an article fabricated from tracks with scan paths rotating between X, Y, negative X, and negative Y directions, the first article will exhibit strongly differing mechanical properties including but not limited to ductility and tensile strength in the X as compared to Y direction, where the second article will not. This may similarly be the case for thermal and electrical properties.

Scan strategies incorporating tracks of different targeted average geometry may be designed with the goal of affecting fabricated article mechanical, electrical, thermal, and other physical properties. More generally, employing such a designed scan strategy will result in a fabricated article of a fundamentally different composition, from the metallurgical and microstructural perspectives, and will impact article physical properties. Such a change in composition can be advantageous. By way of example, in FIGS. 7, 16, and 29, the use of tracks with track cross sections that are of varying height from layer to layer results in a fabricated article with increased shear strength in the Y direction relative to an article fabricated with tracks of the same geometry. This is because in the latter case, the distinct contrast between layers in the Z direction results in shear planes between each layer, whereas the reduced contrast in the former case does not.

Figure 26:
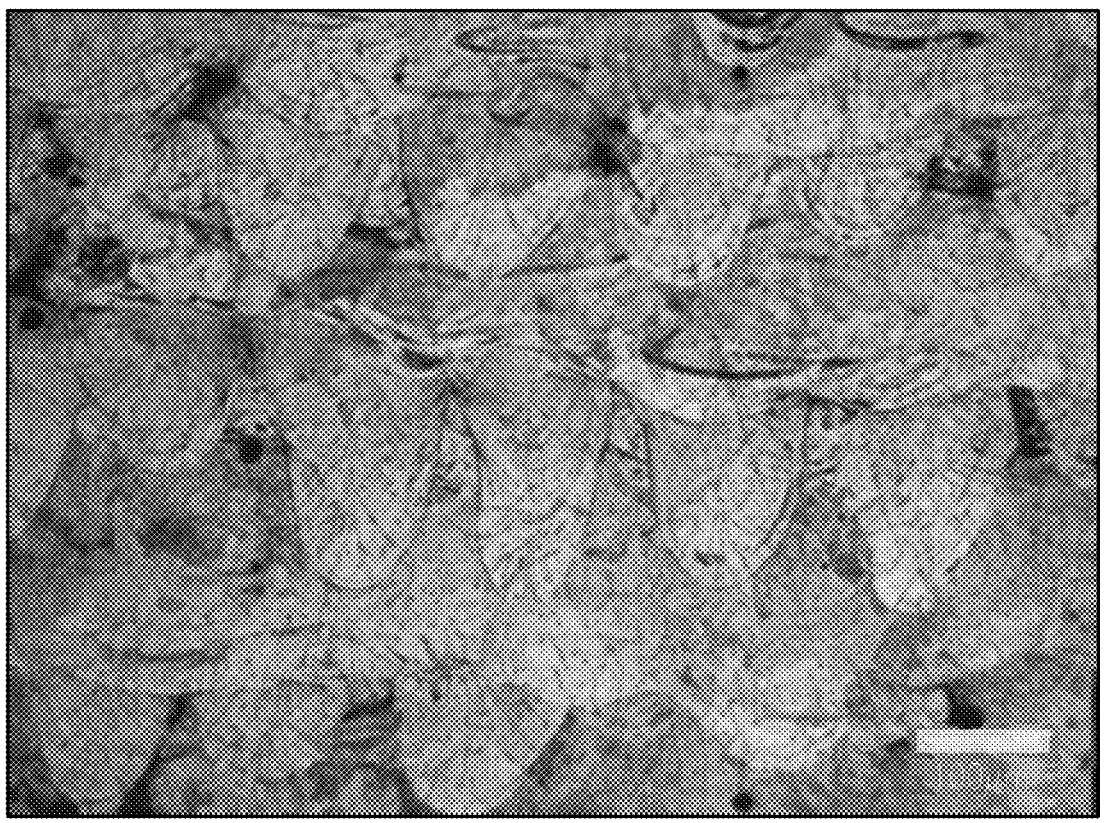
FIG. 26 is an image of a track cross section, with unit normal tangent to half of the scan tracks and perpendicular to the other half, of a part printed in stainless steel by laser powder bed fusion employing an iteration of the two track geometry approach described for FIG. 25. In this case, after producing the two layers as described in FIG. 25, scan tracks are rotated 90 degrees to produce the next two layers, again in the same fashion again as shown in FIG. 25. This two layer build plus 90 degree rotation is repeated as often as required.

By way of example, FIG. 26 is a cross sectional image, with cross section taken tangent to half of the tracks and perpendicular to the other half, of a part printed from steel powder with track settings similar to those that fabricated the tracks shown in FIG. 25. In this case, two layers are printed with parallel (or anti-parallel) tracks, the first with larger tracks generated by slower scan speeds and the second with smaller tracks generated by faster scan speeds; then, two more layers are printed in a similar fashion, but with tracks rotated 90 degrees to the first two layers. This process is repeated. Example 3a describes the differences in porosity achieved by printing at the same laser power, hatch spacing, beam waist and total deposited energy per unit mass but employing 3 different scan track strategies, demonstrating a substantial reduction in porosity by use of the multi-track geometry strategy the microstructure of which is shown in FIG. 26. FIG. 32 consists of images of parts printed using the three different strategies and visually demonstrates the differences in porosity. Example 3b describes the difference in mechanical properties between coupons printed according to the single-track strategy described in U.S. Pat. Nos. 6,596,224 and 6,677,554, and those printed according to the multi-track strategy shown in FIGS. 25 and 26. Despite similar porosity between the coupons printed with the different strategies, there is an increase in yield strength, ultimate tensile strength, and a substantial increase in elongation to failure using the track-geometry varying strategy. FIGS. 25 and 26 clearly demonstrate the composition of matter fabricated by the strategy with track varying geometry via images of the differences in material macro- and micro-structure as compared to the part fabricated by the strategy with single-track geometry, and Example 3b clearly demonstrates the mechanical property differences between the track varying and single track strategy.

Figure 16:
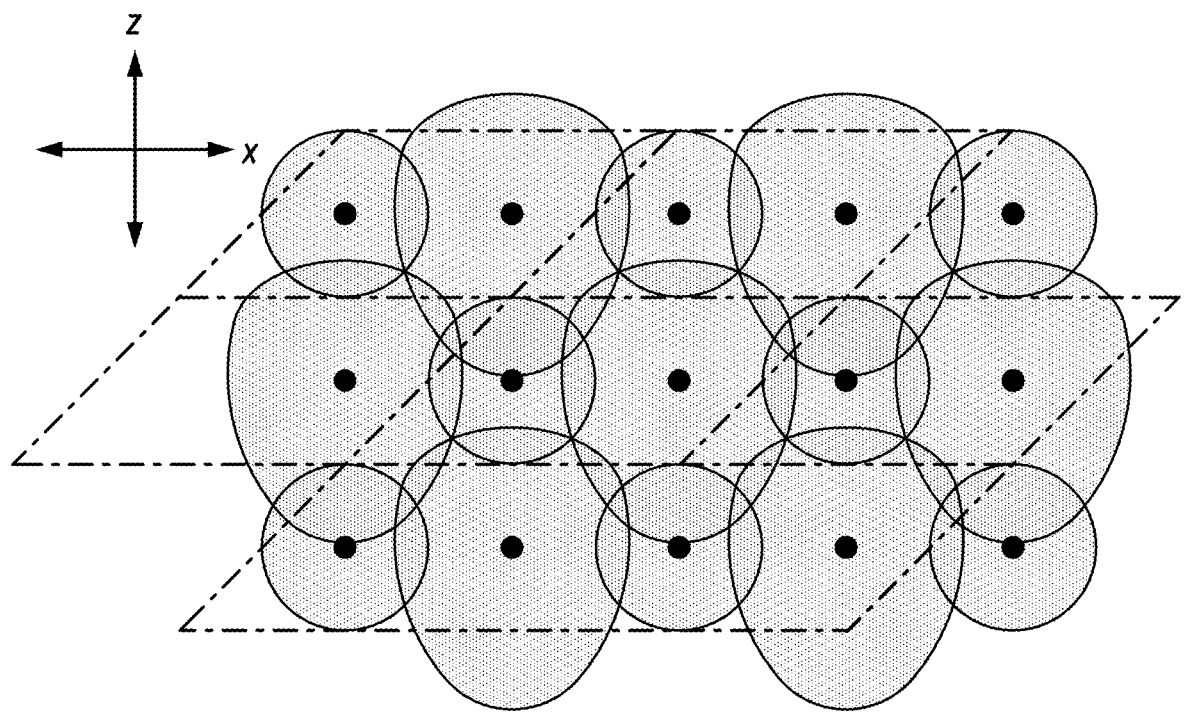
FIG. 16 is an illustration of a path-tangent cross section of a covering problem solution derived scan strategy with a unit cell including two different objects generated from different AM track geometry parameters employing a powder bed fusion, laser sintering, or binder jetting process. For this particular covering solution, a unit cell of two tracks only is the smallest basis unit cell possible. The basis vectors ($b_1$,$b_2$) can be written in units of slice thickness, which is in this case constant, as (1.98, 0.00) and (1.00, 1.00), with, in the same units, larger track width of 1.46 and height of 1.73, and smaller track width and height of 1.00. In this representation, the x-axis direction is to the right, and the z-axis direction is upwards. Scan spacing between tracks is 0.96, amounting a spacing between larger tracks of 1.92 and a spacing between smaller tracks of 1.92. Three layers of tracks are shown where these tracks are all parallel at the cross sectioning plane. It is of note, however, that due to the small variations in height at the surface of the scan tracks printed in each layer, rotation of tracks every layer, every two layers, or every n layers, might be advisable.

Example 4 describes the reduction in porosity found when printing in a powder bed fusion machine using a multi-track strategy derived from the covering problem solution shown in FIG. 16, as compared to printing using a single track strategy. FIG. 27a, an image of the composition fabricated in an aluminum alloy using a strategy similar to the two-track geometry strategy employed in Fig F, viewed in comparison to FIG. 27b, an image of a part fabricated using the same laser power, hatch spacing, and total deposited energy per unit mass as in the composition shown in FIG. 27a but different beam waist and scan tracks, further visually demonstrates the differences in macro- and micro-structure in single vs. multi-track strategies. Example 6 describes advantages to mechanical properties and to porosity in an aluminum alloy employing the multi-track strategy shown in FIG. 27a relative to the single track strategy shown in FIG. 27b. FIG. 28 demonstrates visually for printing in a nickel superalloy the differences in porosity, macro-, and microstructure between two single track and one multi-track strategy, again employing the same laser power, hatch spacing, beam waist, and total deposited energy per unit mass, but different scan tracks. Example 5 describes the differences in porosity that are achieved, as seen in FIG. 28.

Considering multiple printing processes, material families, single and multi-track scan strategies, the multi-track composition is fabricated and demonstrates various advantages relative to parts made using single track strategies. Altering print parameters to fabricate multi-track compositions with improved physical properties and improved manufacturing properties, such as increased machine throughput due to higher speed of fabrication at comparable porosities, is thus a clearly desirable approach in various layer and track-based manufacturing processes.

Employing a material thickness different from net displacement. As has been previously discussed, material thickness and net displacement are generally thought of as the same concept, and along with the slice thickness are termed the layer thickness. However, printers of various types tend to have hardware that is capable, when properly controlled, of individually controlling material (powder) thickness and net displacement. Examples of when using a different material thickness relative to net displacement can be advantageous to fabricated article properties are numerous across various printing methods. Some such examples of advantageous usages follow forthwith; however, those that follow do not constitute a comprehensive list.

In a binder jetting or similar process, consider a powder that is not fully consolidated when deposited in a layer. If the deposited powder thickness is made to be greater than the net displacement by a factor that accounts for consolidation upon deposition of a solution that includes a binder, then a green part with greater fraction of powder relative to solution will result. Such consolidation after deposition can occur, for example, when as the solution is deposited onto powder particles to form a track, solution surface tension tends to draw powder particles toward the track center. Consolidation of particles can also occur due to surface tension drawing particles toward the track center during partial evaporation of the solution in a track, or due to heat or other energy treatment of tracks, or for other reasons. If the amount of solution deposited in a track is fixed, and the powder thickness is increased relative to net displacement, then the result will be, for a powder layer including particles that will consolidate further once suspended, a higher concentration of powder particles relative to solution.

In a powder bed fusion or similar process, the geometry of the track (and track cross section) is dependent on the powder thickness. This can also be the case for a material jetting process where the material tracks harden, solidify, or are exposed to an energy source or other material agent in order to cure, harden or solidify. Consequently, altering the powder thickness allows the capability to alter track geometry without specifically altering the speed of print. Further, any porosity that was caused by a dearth of particles in a specific region of the layer, where the dearth might be due to denudation caused by a neighboring track, uneven layering, or other reasons, could be alleviated by the simple additional presence of powder for a powder layer thicker than net displacement. That is to say, employing a thicker powder layer than net displacement can reduce pores caused by uncontrolled (or stochastic) variables in track formation.

FIG. 29 is an illustration of a scan strategy designed from a covering problem solution employing multiple track object geometries and sizes, multiple net displacements, alternating order of track printing, and multiple material thicknesses that are either greater than or equal to the net displacement within a single layer, depending on the layer. This strategy could be applied, with some modification, in any printing process, but track cross section geometry is in this case drawn to reflect tracks generated employing AM track geometry parameters for a powder bed fusion, laser sintering, or possibly a binder jetting process.

A thinner powder layer relative to net displacement in a powder bed fusion or similar process might also be advantageous. Though the specifics of the geometry of a track (and track cross section) are dependent on the AM track geometry and feedstock parameters, parameters are often used such that employing a thinner powder layer will result in a track with more depth and less width as compared to a powder layer of thickness equal to that of the net displacement. Increasing track depth while decreasing track width is advantageous to decreasing porosity in the cases where hatch spacing is sufficiently small but where there is insufficient inter-layer fusing and re-fusing to ensure successive layers are completely fused.

Figure 30A:
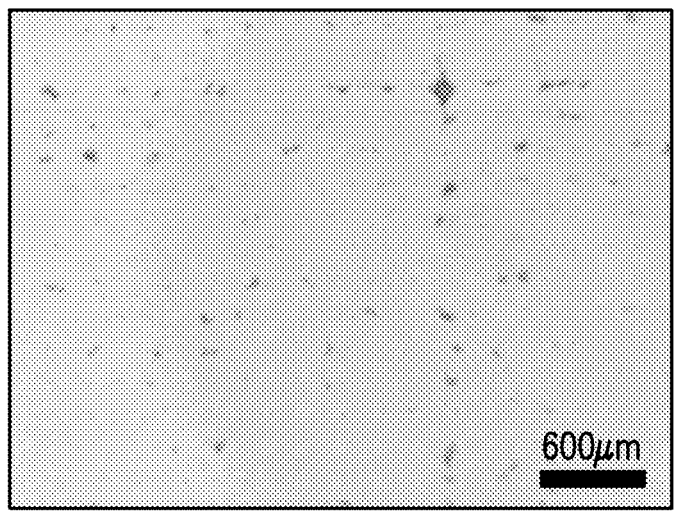
FIG. 30a is a cross sectional image of a part printed in stainless steel by laser powder bed fusion employing a one track scan strategy similar to that described for FIG. 8. In this case, a laser power of 260 W, hatch spacing of 140 um, a net displacement and powder thickness of 50 um, a gaussian beam waist of 91 um, and a scan speed of 1004 mm/s were used to generate the tracks. Measured porosity for this part was 0.48%, higher than that measured for the part shown in FIG. 30b.
Figure 30B:
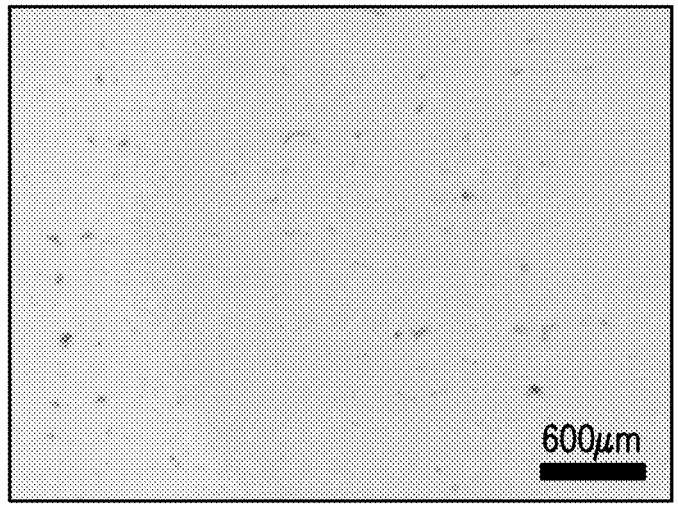
FIG. 30b is a cross sectional image of a part printed in stainless steel by laser powder bed fusion employing a one track scan strategy similar to that described for FIG. 8. In this case, a laser power of 260 W, hatch spacing of 140 um, a net displacement of 50 um, a powder thickness of 60 um, a gaussian beam waist of 91 um, and a scan speed of 1004 mm/s were used to generate the tracks. Measured porosity for this part was 0.21%, considerably lower than that measured for the part shown in FIG. 30a. The decrease in porosity is attributable to the increase in powder thickness relative to net displacement.
Figure 31A:
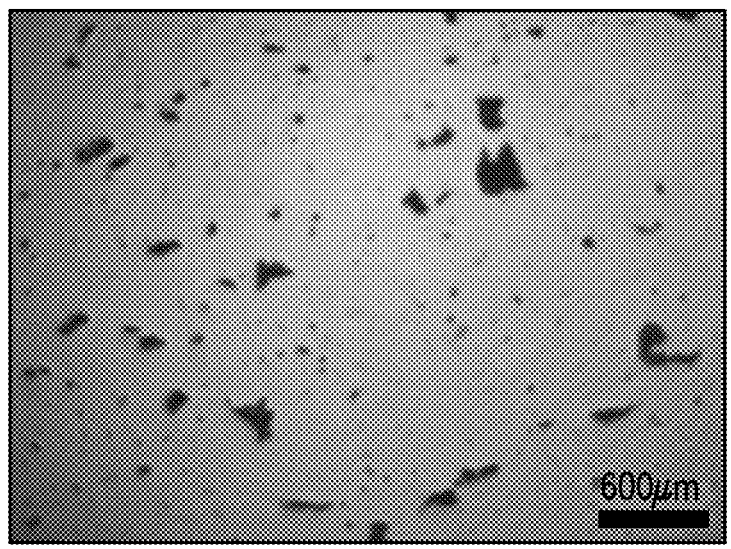
FIG. 31a is a cross sectional image of a part printed in an aluminum alloy by laser powder bed fusion employing a similar two track scan strategy as to that described for FIG. 27. In this case, a laser power of 650 W, hatch spacing of 200 um, and a net displacement and powder thickness of 50 um were employed, where the scanning speed used to fabricate the larger tracks was about 1.9 times that of the speed used to generate the smaller tracks, and the gaussian beam waste used to generate the larger tracks was about twice the size of that used to generate the smaller tracks. Measured porosity for this part was 3.29%, far higher than that measured for the part shown in FIG. 31b, which was printed using the same total deposited energy per unit mass as the part shown here.
Figure 31B:
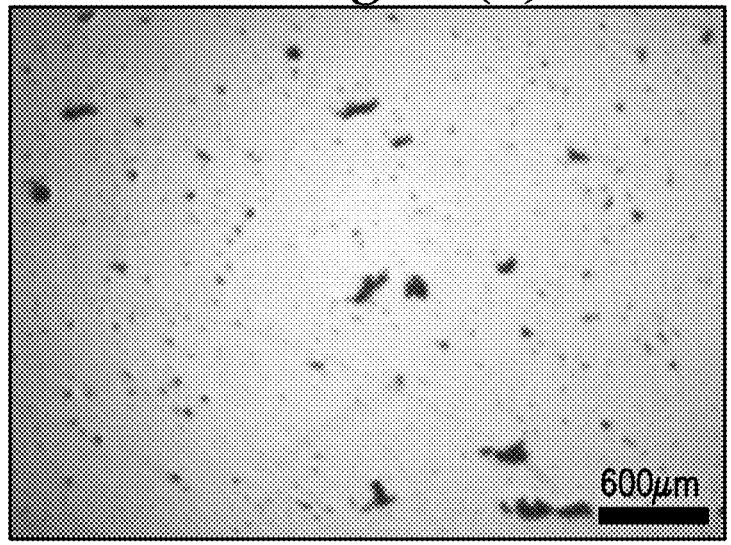
FIG. 31b is a cross sectional image of a part printed in an aluminum alloy by laser powder bed fusion employing a similar two track scan strategy as to that described for FIG. 31a. In this case, the difference between strategies was that for this part, a powder thickness of 60 um rather than 50 um was applied. Measured porosity for this part was 1.79%, considerably lower than that measured for the part shown in FIG. 31a. The decrease in porosity is attributable to the increase in powder thickness relative to net displacement.

FIG. 30 is a comparison of cross sectional images of parts printed in steel using the same single track scan strategy; however, for the part shown in FIG. 30a, material thickness and net displacement are both 50 um, and for the part shown in FIG. 30b, net displacement is 50 um but powder thickness is 60 um. Improvements in part porosity, macro- and micro-structure are clearly visible: Example 7 describes the benefit to porosity quantitatively. FIG. 31 is a comparison of cross sectional images of parts printed in aluminum using the same multi-track scan strategy; however, for the part shown in FIG. 31a, material thickness and net displacement are both 50 um, and for the part shown in FIG. 31b, net displacement is 50 um but powder thickness is 60 um. Improvements in part porosity, macro- and micro-structure are visible: Example 8 describes the benefit to porosity quantitatively.

EXAMPLES

In all examples below, the standard deviations provided are those calculated for multiple parts or coupons built at different locations on the build platform during a single build, unless otherwise specified.

Example 1

In this example, material jetting via a fused deposition modeling printer with a single 400 um nozzle and a thermoplastic polymer feed wire consisting principally of polylactic acid is deployed to print three 20 mm cubes, each with different print parameters. Two cubes employ single track scan strategies with identical printer settings except that each cube is printed with a different extrusion volume ratio setting, and one cube employs a multi-track scan strategy with the same parameter settings as for the single track strategy except where alternation between two extrusion volume ratio settings is employed for printing successive tracks resulting in two distinct scan track geometries, along the lines of the strategy described for FIG. 26. In this case, only one cube of each type was printed; therefore, the standard deviations given for porosities are those measured across multiple images taken at different locations within the cube. The standard deviations given for mass are a measure of precision balance repeatability.

Single Track Cubes:

FIGS. 8 and 9 are cross sectional images of the single track geometry cubes, printed employing the following printer settings (and others not here listed) on the Prusa i3 machine:
Bed temperature: 40 C
Extruder Temperature: 190 C
Fan Power: 100%
Feed Rate (i.e. speed head moves): 1800 mm/s
Hatch Spacing: 400 um
Nozzle Diameter: 400 um
Layer thickness 200 um
Cube 1 extrusion volume ratio: 0.35
Cube 2 extrusion volume ratio: 0.52

Measured porosity for Cube 1 is 8%+/−0.6%, with a total mass of 8.704 g+/−0.005 g; measured porosity for Cube 2 is 7%+/−1.3% away from the edges, with a total mass of 3.071 g+/−0.005 g, principally because the print did not complete due to build failure resulting in only about 36% of the "cube" being printed.

Multi-Track Cube:

FIG. 11 is a cross sectional image of the multi-track geometry cube, printed employing the following printer settings (and others not here listed) on the Prusa i3 machine:
Bed temperature: 40 C
Extruder Temperature: 190 C
Fan Power: 100%
Feed Rate (i.e. speed head moves): 1800 mm/s
Hatch Spacing: 400 um
Nozzle Diameter: 400 um
Layer thickness 200 um
Smaller track extrusion volume ratio: 0.31
Larger track extrusion volume ratio: 0.63

Measured porosity for the multi-track cube is 2.3%+/−0.2%, with a total mass of 9.260 g+/−0.005 g. It is clear from the data that the amount of material extruded for a track is not linearly proportional to the extrusion volume ratio setting; however the results of implementing the multi-track strategy are clear: substantially reduced porosity without sacrifice of geometric part accuracy or increase in surface roughness.

Example 2

Material jetting via a fused deposition modeling printer with a single 400 um nozzle and a thermoplastic polymer feed wire consisting principally of polylactic acid is deployed to print three 20 mm cubes, each with different print parameters. Two cubes employ single track scan strategies with identical printer settings except that each cube is printed with a different extrusion volume ratio setting, and one cube employs a multi-track scan strategy with the same parameter settings as for the single track strategy except where alternation between two extrusion volume ratio settings is employed for printing successive tracks resulting in two distinct scan track geometries, along the lines of the strategy described for FIG. 16 and an exemplar image of which is depicted in Fig D. In this case, only one cube of each type was printed; therefore, the standard deviations given for porosities are those measured across multiple images taken at different locations within the cube. The standard deviations given for mass are a measure of precision balance repeatability.

Single Track Cubes:

FIGS. 8 and 9 are cross sectional images of the single track geometry cubes, printed employing the following printer settings (and others not here listed) on the Prusa i3 machine:
Bed temperature: 40 C
Extruder Temperature: 190 C
Fan Power: 100%
Feed Rate (i.e. speed head moves): 1800 mm/s
Hatch Spacing: 400 um
Nozzle Diameter: 400 um
Layer thickness 200 um
Cube 1 extrusion volume ratio: 0.35
Cube 2 extrusion volume ratio: 0.52

Measured porosity for Cube 1 is 8%+/−0.6%, with a total mass of 8.704 g+/−0.005 g; measured porosity for Cube 2 is 7%+/−1.3% away from the edges, with a total mass of 3.071 g+/−0.005 g, principally because the print did not complete due to build failure resulting in only about 36% of the "cube" being printed.

Multi-Track Cube:

FIG. 10 is a cross sectional image of the multi-track geometry cube, printed employing the following printer settings (and others not here listed) on the Prusa i3 machine:

Bed temperature: 40 C
Extruder Temperature: 190 C
Fan Power: 100%
Feed Rate (i.e. speed head moves): 1800 mm/s
Hatch Spacing: 400 um
Nozzle Diameter: 400 um
Layer thickness 200 um
Smaller track extrusion volume ratio: 0.34
Larger track extrusion volume ratio: 0.69

Measured porosity for the multi track cube is 0.2%+/−0.06%, with a total mass of 9.440 g+/−0.005 g. It is clear from the data that the amount of material extruded for a track is not linearly proportional to the extrusion volume ratio setting; however the results of implementing the multi-track strategy are clear: the near elimination of porosity without sacrifice of geometric part accuracy or increase in surface roughness.

Example 3

In this example, porosity and mechanical property results are described for powder bed fusion printing of parts from two 316 L stainless steel powders exhibiting for Example 3a a d50 of 18 um and for Example 3b a d50 of 45 um. Four 1 cm porosity cubes are printed for each of the three strategies (two single track, one multi-track) with some print settings described in Example 3a, and three 7.5 cm long (with 2.5 cm gauge) dogbone tensile coupons are printed for each of the two strategies (one single track, one multi-track) with some print settings described in Example 3b. The single track approaches in Example 3a deploy the scan strategies described for FIGS. 32c and 32b, and the multi-track strategy deploys the scan strategy described for FIG. 32a. The scan paths for the single and multi-track strategies in Example 3b are similar to those described for FIGS. 32c and 32a, respectively.

Example 3a

Porosity

Figure 32A:
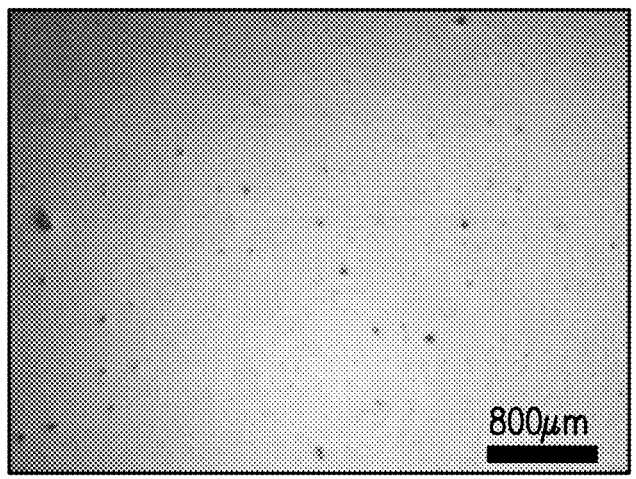
FIG. 32a is a cross sectional image of a part printed in stainless steel by laser powder bed fusion employing a similar two track scan strategy as to that described for FIG. 26. In this case, a laser power of 252 W, hatch spacing of 140 um, a net displacement and powder thickness of 50 um, and a gaussian beam waist of 55 um were employed, where the scanning speed used to fabricate the larger tracks was about 1.6 times that of the speed used to generate the smaller tracks. Measured porosity for this part was 0.23%, far lower than that measured for the parts shown in FIGS. 32b and 32c, which were printed using the same total deposited energy per unit mass as the part shown here.
Figure 32B:
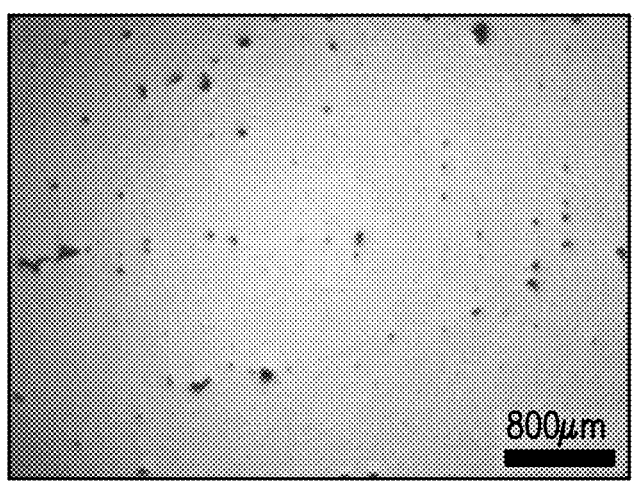
Figure 32C:
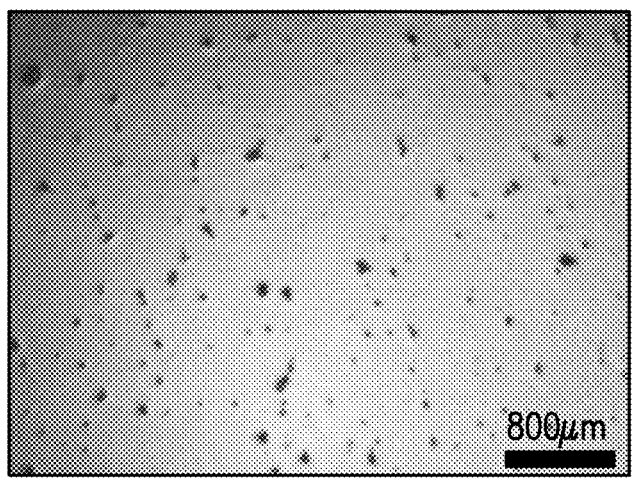
FIG. 32c is a cross sectional image of a part printed in stainless steel by laser powder bed fusion employing a one track scan strategy similar to that described for FIG. 8. In this case, a laser power of 252 W, hatch spacing of 140 um, a net displacement and powder thickness of 50 um, and a gaussian beam waist of 55 um were used to generate the tracks, where the total deposited energy per unit mass was the same as for those parts shown in FIGS. 32a and 32b. Measured porosity for this part was 1.13%, much higher than that measured for the parts shown in both FIGS. 32a and 32b.

Single Track Cubes
Laser Power: 252 W
Hatch Spacing: 140 um
Gaussian Beam Waist: 55 um
Net Displacement: 50 um
Powder Thickness: 50 um
Scanning Speed: 1190 mm/s Average measured porosity for the cubes printed according to the strategy described for FIG. 32b is 0.560%+/−0.073%, and for the cubes printed according to the strategy described for FIG. 32c, it is 1.127%+/−0.147%.
Multi-Track Cubes:
Laser Power: 252 W
Gaussian Beam Waist: 55 um
Hatch Spacing: 140 um
Net Displacement: 50 um
Powder Thickness: 50 um
Scanning Speed Ratio: 1.6

Averaged measured porosity for the cubes printed according to the strategy described for FIG. 32a is 0.231%+/−0.030%, far lower than porosity for the single track strategies. In this case, the energy deposited per unit mass (and total print time) for the cubes printed by all three strategies were identical, leading to the clear conclusion that the multi-track strategy delivers substantially lower porosity for equal energy input and time of print. Taking another angle, the energy input, and consequently the print time, using the multi-track strategy described could have been reduced until the porosity of the cubes produced was equal to that of one of the single track strategies. In this case, the same porosity would have been delivered with a considerably faster print speed, thereby resulting in comparable parts across the strategies but a substantial increase in throughput for the multi-track strategy.

Example 3b

Mechanical Properties

Single Track Tensile Bars:
Laser Power: 252 W
Hatch Spacing: 140 um
Gaussian Beam Waist: 55 um
Net Displacement: 50 um
Powder Thickness: 50 um
Scanning Speed: 1066 mm/s
Multi-Track Tensile Bars:
Laser Power: 252 W
Hatch Spacing: 140 um
Gaussian Beam Waist: 55 um
Net Displacement: 50 um
Powder Thickness: 50 um
Scanning Speed Ratio: 1.6

The energy deposited per unit mass (and total print time) was identical for both the single track and multi-track bars printed. All bars were oriented identically in the build chamber, and scan path directions were identical before rotation. However, the total energy deposited per unit mass was greater for the bars printed in Example 3b as compared to the cubes printed for Example 3a. This was to help eliminate the differential in porosity between the single and multi-track scan strategies, such that the tensile properties of the bars could be compared on the basis of roughly equivalently porosity. Additionally to this end, the change in powder made to print the bars for Example 3b vs. printing the cubes for Example 3a led to further reduced porosity. The single track strategy bars, printed corresponding to the "interleaved" strategy described in U.S. Pat. Nos. 6,596,224 and 6,677,554, exhibited average ultimate tensile strength of 777 MPa+/−10.5 MPa, yield strength of 621 MPa+/−12.9 MPa, and elongation to failure of 22%+/−1.7%. The multi-track strategy bars exhibited ultimate tensile strength of 802 MPa+/−4.0 MPa, yield strength of 645 MPa+/−16.5 MPa, and elongation to failure of 36%+/−1.7%.

It is clear from the mechanical property results measured that the multi-track strategy, even at comparable porosity, yields a composition of matter with multiple mechanical properties that exceed those of the parts printed by the single track strategy. Performing Welch's t-Test to calculate confidence values, we find that with 96.94% confidence the ultimate tensile strength is greater for the multi-track strategy printed bars, with 92.93% confidence the yield strength is greater for the multi-track strategy printed bars, and that with 99.97% confidence the elongation to failure is greater for the multi-track strategy printed bars. It is therefore clear that the macro- and micro-structures generated by the multi-track strategy produce a different composition, measured by mechanical properties, than that generated by the single track strategy.

Example 4

Porosity results are measured for powder bed fusion printing of parts from a 316 L stainless steel powder similar to that used for the printing of bars in Example 3b. Four 1 cm porosity cubes are printed for each of the two strategies (one single track strategy, one multi-track), with some print settings described below. The scan paths for the single track strategy are similar to those described for FIG. 32c, and the multi-track strategy is based on the covering problem solution described in FIG. 16, similar to that described for material jetting in FIG. 12.

Single Track Cubes:
Laser Power: 252 W
Hatch Spacing: 120 um
Gaussian Beam Waist: 55 um
Net Displacement: 50 um
Powder Thickness: 50 um
Scanning Speed: 1161 mm/s
Multi-Track Cubes:
Laser Power: 252 W
Hatch Spacing: 120 um
Gaussian Beam Waist: 55 um
Net Displacement: 50 um
Powder Thickness: 50 um
Scanning Speed Ratio: 1.5

The energy deposited per unit mass (and total print time) was identical for both the single track and multi-track cubes printed. Average measured porosity for the cubes printed according to the single track strategy was 0.844%+/−0.110%, and for the cubes printed according to the multi-track strategy, it was 0.580%+/−0.076%. Applying Welch's t-Test, it can be stated with 99.46% confidence that the cubes printed from the multi-track strategy achieve reduced porosity relative to the cubes printed from the single track strategy; this result is in-line with other results measured for comparative printing with these two strategies.

Example 5

In this example, porosity results are described for powder bed fusion printing of parts from a nickel superalloy powder with a d50 of 21 um. Four porosity coupons measuring 1×1×0.5 cm are printed for each of three strategies (two single track, one multi-track) with some print settings described below. The single track approaches deploy the scan strategies described for FIGS. 28b and 28c, and the multi-track strategy deploys the scan strategy described for FIG. 28a. For all cubes, energy deposited per unit mass and total print time were identical.

Figure 28A:
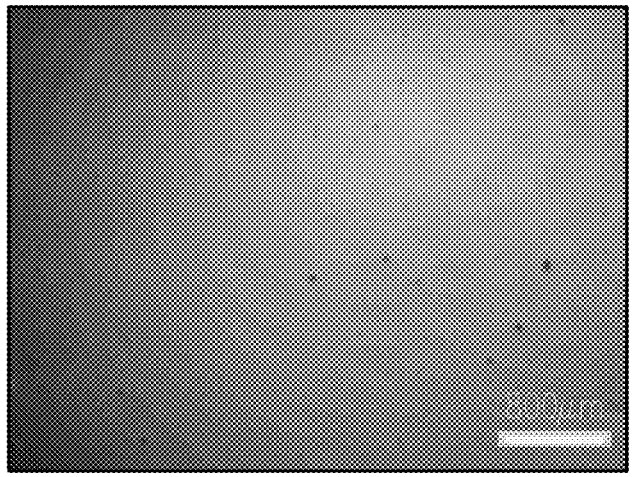
FIG. 28a is a cross sectional image of a part printed in nickel superalloy by laser powder bed fusion employing a similar two track scan strategy as to that described for FIG. 26. In this case, a laser power of 269 W, hatch spacing of 140 um, a net displacement and powder thickness of 50 um, and a gaussian beam waist of 55 um were employed, where the scanning speed used to fabricate the larger tracks was twice that of the speed used to generate the smaller tracks. Measured porosity for this part was 0.12%, far lower than that measured for the parts shown in FIGS. 28b and 28c, which were printed using the same total deposited energy per unit mass as the part shown here.
Figure 28B:
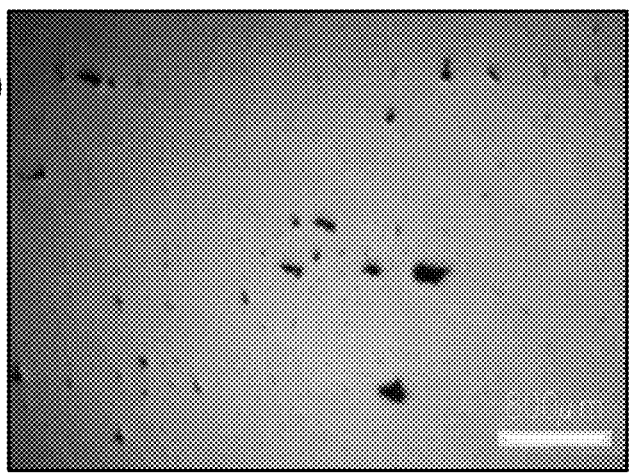
Figure 28C:
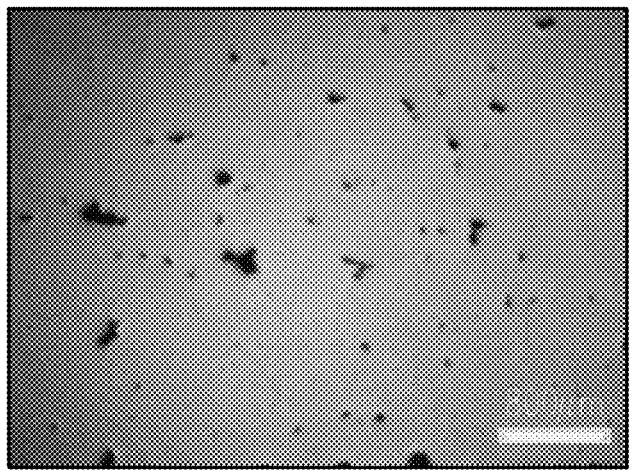
FIG. 28c is a cross sectional image of a part printed in nickel superalloy by laser powder bed fusion employing a one track scan strategy similar to that described for FIG. 8. In this case, a laser power of 269 W, hatch spacing of 140 um, a net displacement and powder thickness of 50 um, and a gaussian beam waist of 55 um were used to generate the tracks, where the total deposited energy per unit mass was the same as for those parts shown in FIGS. 28a and 28b. Measured porosity for this part was 0.69%, higher than that measured for the parts shown in both FIGS. 28a and 28b.

Single Track Cubes
Laser Power: 269 W
Hatch Spacing: 140 um
Gaussian Beam Waist: 55 um
Net Displacement: 50 um
Powder Thickness: 50 um
Scanning Speed: 1071 mm/s Average measured porosity for the cubes printed according to the strategy described for FIG. 28b, the "interleaved" strategy, is 0.497%+/−0.065%, and for the cubes printed according to the strategy described for FIG. 28c, it is 0.691%+/−0.092%.

Multi-Track Cubes:
Laser Power: 252 W
Gaussian Beam Waist: 55 um
Hatch Spacing: 140 um
Net Displacement: 50 um
Powder Thickness: 50 um
Scanning Speed Ratio: 1.6

Averaged measured porosity for the cubes printed according to the strategy described for FIG. 28a is 0.117%+/−0.015%, far lower than for the single track strategies. Given that the total print time and energy deployed were identical, the conclusion is clear that the multi-track strategy delivers improvement in structure and efficiency. Taking another angle, the energy input, and consequently the print time, using the multi-track strategy described could have been reduced until the porosity of the cubes produced was equal to that of one of the single track strategies. In this case, the same porosity would have been delivered with a considerably faster print speed, thereby resulting in comparable parts across the strategies but with a substantial increase in throughput for the multi-track strategy.

Example 6

Porosity and mechanical property results are described for powder bed fusion printing of parts from two aluminum alloy (AlSi10Mg) powders exhibiting for Example 6a a d50 of 32 um and for Example 3b a d50 of 41 um. Four 1 cm porosity cubes are printed for each strategy, one single track strategy and one multi-track, with some print settings described in Example 6a, and three 7.5 cm long (with 2.5 cm gauge) dogbone tensile coupons are printed for two similar strategies (one single track and one multi-track) with some print settings described in Example 6b. The single track approaches in Examples 6a and 6b deploy the scan paths described for FIG. 27b, where FIG. 27b is a cross sectional image of one of the cubes printed for Example 6a, and the multi-track approaches in Examples 6a and 6b deploy the scan paths described for FIG. 27a, where FIG. 27a is the cross sectional image of one of the cubes printed for Example 6a.

Example 6a

Porosity

Single Track Cubes
Laser Power: 375 W
Hatch Spacing: 220 um
Gaussian Beam Waist: 46 um
Net Displacement: 50 um
Powder Thickness: 50 um
Scanning Speed: 1311 mm/s
Multi-Track Cubes:
Laser Power: 375 W
Gaussian Beam Waist Ratio: 1.3
Hatch Spacing: 220 um
Net Displacement: 50 um
Powder Thickness: 50 um
Scanning Speed Ratio: 1.4

Averaged measured porosity for the cubes printed according to the single track strategy described for FIG. 27b is 1.211%+/−0.158%, and averaged measured porosity for the cubes printed according to the multi-track strategy described for FIG. 27a is 0.663%+/−0.086%, far lower than the porosity for the single track strategy. The energy deposited per unit mass (and total print time) for the cubes printed by both strategies were identical, leading to the clear conclusion that the multi-track strategy delivers substantially lower porosity for equal energy input and time of print. Taking another angle, the energy input, and consequently the print time, using the multi-track strategy described could have been reduced until the porosity of the cubes produced was equal to that of the single track strategy. In this case, the same porosity would have been delivered with a considerably faster print speed, thereby resulting in comparable parts across the strategies but a substantial increase in throughput for the multi-track strategy.

Example 6b

Mechanical Properties

Single Track Tensile Bars:
Laser Power: 375 W
Hatch Spacing: 180 um
Gaussian Beam Waist: 88 um
Net Displacement: 50 um
Powder Thickness: 50 um
Scanning Speed: 1389 mm/s
Multi-Track Tensile Bars:
Laser Power: 375 W
Hatch Spacing: 180 um
Gaussian Beam Waist Ratio: 1.3
Net Displacement: 50 um
Powder Thickness: 50 um
Scanning Speed Ratio: 1.4

In this case, the energy deposited per unit mass and total print time were each 3.3% lower for the multi-track print strategy relative to the single track strategy. All bars were oriented identically in the build chamber, and scan path directions were identical. The single track strategy bars exhibited average ultimate tensile strength of 386.6 MPa+/−7.2 MPa, yield strength of 238.8 MPa+/−2.9 MPa, and elongation to failure of 3.63%+/−0.05%. The multi-track strategy bars exhibited ultimate tensile strength of 373.9 MPa+/−15.3 MPa, yield strength of 234.4 MPa+/−11.5 MPa, and elongation to failure of 8.33%+/−3.37%.

The elongation to failure results measured that the multi-track strategy, even given a reduced energy deposited and total print time, yield a composition of matter with elongation to failure that exceeds the performance of that of the parts printed by the single track strategy. Using Welch's t-Test to calculate confidence values, we find that the ultimate tensile strength and yield strength of the bars printed with different strategies fall within one standard deviation of one another, suggesting that they are not distinct; however, we find that with 93.1% confidence the elongation to failure is greater for the multi-track strategy printed bars. It is apparent therefore the macro- and micro-structures generated by the multi-track strategy produce a different and preferable composition, measured by mechanical properties, than that generated by the single track strategy. This result distinguishing mechanical properties between the composition and parts generated by single track strategies (holding energy deposited per unit mass and print time roughly comparable) with favorable results attributed to the multi-track strategy parts is common among other comparative tests as well. This is due to the fact that the optimization phase space available to strategies with multiple track geometries is far greater than that available to strategies incorporating only one track geometry.

Example 7

Porosity results are measured for powder bed fusion printing of parts from a 316 L stainless steel powder similar to that used for the printing of cubes in Example 3b. Four 1 cm porosity cubes are printed for each of the two strategies (one single track strategy with equal net displacement and powder thickness, one single track strategy with differing net displacement and powder thickness), with some print settings described below. The scan strategies are those described for FIG. 30, where the energy deposited per unit mass (and total print time) was identical for both strategies.

Equal Net Displacement and Powder Thickness:
Laser Power: 252 W
Hatch Spacing: 140 um
Gaussian Beam Waist: 91 um
Net Displacement: 50 um
Powder Thickness: 50 um
Scanning Speed: 1004 mm/s
Unequal Net Displacement and Powder Thickness:
Laser Power: 252 W
Hatch Spacing: 140 um
Gaussian Beam Waist: 91 um
Net Displacement: 50 um
Powder Thickness: 60 um
Scanning Speed: 1004 mm/s Average measured porosity for the cubes printed according to the equal net displacement and powder thickness strategy was 0.478%+/−0.062%, and for the cubes printed according to the unequal net displacement and powder thickness strategy, it was 0.206%+/−0.027%. Applying Welch's t-Test, it can be stated with 99.94% confidence that the cubes printed from the unequal net displacement and powder thickness strategy reduced porosity relative to the cubes printed with equal net displacement and powder thickness.

Example 8

Porosity results are measured for powder bed fusion printing of parts from an aluminum alloy powder with a d50 of 27 um. Four 1 cm porosity cubes are printed for each of the two strategies (one multi-track strategy with equal net displacement and powder thickness, one multi-track strategy with differing net displacement and powder thickness), with some print settings described below. The scan strategies are those described for FIG. 31, where the energy deposited per unit mass (and total print time) was identical for both strategies.

Equal Net Displacement and Powder Thickness:
Laser Power: 650 W
Hatch Spacing: 200 um
Gaussian Beam Waist Ratio: 1.4
Net Displacement: 50 um
Powder Thickness: 50 um
Scanning Speed Ratio: 1.9
Unequal Net Displacement and Powder Thickness:
Laser Power: 650 W
Hatch Spacing: 200 um
Gaussian Beam Waist Ratio: 1.9
Net Displacement: 50 um
Powder Thickness: 60 um
Scanning Speed Ratio: 1.9

Average measured porosity for the cubes printed according to the equal net displacement and powder thickness strategy was 3.29%+/−0.43%, and for the cubes printed according to the unequal net displacement and powder thickness strategy, it was 1.79%+/−0.23%. Applying Welch's t-Test, it can be stated with 99.82% confidence that the cubes printed from the unequal net displacement and powder thickness strategy reduced porosity relative to the cubes printed with equal net displacement and powder thickness. This is the case employing a multi-track scan strategy with an aluminum alloy powder, and it was also the case in the presence of the single track strategy with steel powder in Example 7.

The invention claimed is:

1. An additively manufactured composition, printed using a scan or track based process, or any additive manufacturing process generating layers with surface geometry similar to that produced by any scan or track based process, where within a region of a printed article:
   a. tracks or track cross sections exhibit a plurality of geometries (shapes and/or sizes), either within a single layer contained within the region or across a plurality of successive layers,
   b. configurations of the tracks or track cross sections can be characterized by a unit cell, described on an average across tracks or track cross sections in Euclidean or other geometric space, with a basis of no less than two,
   c. the tracks printed within the unit cell are connected within the unit cell in a sense that there is no connected area (volume) of unprinted material or space within the unit cell larger than an area (volume) of the largest track cross section (track), and
   d. where portions of or all of at least two adjacent unit cells are present in each layer that is partially or entirely contained within the region.

2. The composition of claim 1, where within a region of the printed article, the configurations and average geometries of tracks or track cross sections form a covering problem solution or near-solution including a plurality of unit cells within a portion of each layer contained within the region.

3. The composition of claim 1, wherein track geometry or track cross sections are all or nearly all substantially similar to one another within a region of a layer n, and where in an adjoining region of the plurality of successive layers n+1, track geometry or track cross sections are also all or nearly all substantially similar to one another, but different from those in layer n.

4. The composition of claim 1, wherein a plurality of track geometries or track cross sections are employed within a region of or all of at least one layer, and where these track geometries or track cross sections differ in a coordinated fashion within the regions of the at least one layer which they are employed.

5. The composition of claim 1, wherein the tracks are all parallel or anti-parallel.

6. The composition of claim 1, wherein the tracks in a region of a given layer are rotated by non-zero angle relative to those in a prior layer.

7. The composition of claim 1, wherein the tracks in a region of a given layer or layers follow one or more non-straight contours.

8. The composition of claim 1, wherein the layers on which the tracks in a region of an article are printed are non-planar.

9. The composition of claim 1, wherein an order of printing of tracks within a region of a layer or layers is such that either adjacent tracks or non-adjacent tracks are printed successively.

10. The composition of claim 9, wherein the order of printing is such that all tracks of one geometry are printed, then tracks of a different geometry are printed.

11. The composition of claim 2, wherein the plurality of geometries (size and/or shape), and/or the configuration of the tracks printed is non-periodic or quasicrystalline.

* * * * *